United States Patent [19]
Takahashi

[11] Patent Number: 6,084,747
[45] Date of Patent: Jul. 4, 2000

[54] MAGNETIC HEAD DEVICE

[75] Inventor: Tomoyuki Takahashi, Miyagi, Japan

[73] Assignee: Sony Corporation, Tokyo, Japan

[21] Appl. No.: 09/044,246

[22] Filed: Mar. 19, 1998

[30] Foreign Application Priority Data

| Mar. 19, 1997 | [JP] | Japan | 9-067073 |
| Mar. 19, 1997 | [JP] | Japan | 9-067074 |
| Mar. 19, 1997 | [JP] | Japan | 9-067075 |

[51] Int. Cl.[7] .................................................. G11B 5/48
[52] U.S. Cl. ........................................................... 360/104
[58] Field of Search ................................... 360/104, 105; 369/253, 256

[56] References Cited

U.S. PATENT DOCUMENTS

| 5,535,075 | 7/1996 | Takahashi | 360/105 |
| 5,594,607 | 1/1997 | Erpelding | 360/104 |
| 5,606,477 | 2/1997 | Erpelding et al. | 360/104 |
| 5,657,300 | 8/1997 | Takahashi | 369/13 |
| 5,663,937 | 9/1997 | Takahashi | 369/83 |
| 5,682,280 | 10/1997 | Takahashi et al. | 360/105 |
| 5,781,379 | 7/1998 | Erpelding et al. | 360/104 |
| 5,822,154 | 10/1998 | Takahashi et al. | 360/104 |

*Primary Examiner*—William J. Klimowicz

[57] ABSTRACT

A magnetic head device in which, if a rotated magneto-optical disc is subjected to surface deviations, a slide contact member can have a sliding contact with the magneto-optical disc at a constant slide contact posture at all times to make possible correct application of an external magnetic field. To this end, first resilient flexible portions (7, 7) and second resilient flexible portions (8, 8) have spring constants set so that a point for which an angular change of the first resilient flexible portions (7, 7) is always equal to an angular change of the second resilient flexible portions (8, 8) that is an equilibrium point, will be present within the extent of a slide contact area.

5 Claims, 13 Drawing Sheets

MAGNETIC HEAD DEVICE

BACKGROUND OF THE INVENTION

1. Field of the Invention

This invention relates to a magnetic head device used in a photomagnetic recording/reproducing apparatus employing a photomagnetic recording medium, such as a magneto-optical disc.

2. Description of the Related Art

There has been used a photomagnetic recording/reproducing apparatus employing, as a recording medium, a magneto-optical disc having a photomagnetic recording layer comprised of a perpendicular magnetic recording film on a light-transmitting transparent substrate.

The photomagnetic recording/reproducing apparatus has, in a facing relation to a major surface of the magneto-optical disc, run in rotation by a disc rotating driving mechanism, an optical pickup device adapted for radiating a light beam on the photomagnetic recording layer, while having, in a facing relation to the opposite major surface of the magneto-optical disc, a magnetic head device for applying an external magnetic field across the photomagnetic recording layer.

With the magneto-optical disc recording/reproducing apparatus, a magnetic field modulated in magnetic field orientation depending on the information signals to be recorded is applied by the magnetic head device, at the same time as a light beam radiated by the optical pickup device is condensed and illuminated on the photomagnetic recording layer. The portion of the recording layer heated to higher than the Curie temperature by the irradiated light beam and which has lost its coercivity is magnetized depending on the direction of the magnetic field applied by the magnetic head device and subsequently is cooled to lower than the Curie temperature as a result of relative movement of the light beam by rotation of the magneto-optical disc to fix the direction of magnetization to record information signals.

Thus, the conventional magnetic head device includes an electro-magnetic control mechanism adapted for displacing the magnetic head so as to follow up with surface deviations of the magneto-optical disc, in order to maintain a constant spacing between the magnetic head and the magneto-optical disc in a contact-free manner, even although such surface deviations are produced on rotating the magneto-optical disc due to warping or fluctuations in thickness of the magneto-optical disc.

The magnetic head device provided with an electromagnetic control mechanism adapted for maintaining a constant spacing between the magnetic head and the magneto-optical disc is in need of power for driving the electromagnetic control mechanism, thus increasing power consumption. In addition, the magnetic head device is in need of a detection mechanism for detecting the spacing between the magnetic head and the magneto-optical disc thus complicating the mechanism for controlling the magnetic head device. Moreover, the recording/reproducing apparatus is complicated in structure to render it extremely difficult to reduce the size and the thickness of the device itself.

There is proposed a photomagnetic recording/reproducing apparatus having a magnetic head device for recording information signals, with the magnetic head in contact with the magneto-optical disc, in place of the magnetic head device adapted for controlling the magnetic head at a pre-set separation from the magneto-optical disc liable to surface deviations as a result of rotation.

In the magnetic head device employed in this type of the magneto-optical disc recording/reproducing apparatus, a magnetic head device comprised of a magnetic core and a bobbin carrying a coil is supported at the distal end of a head supporting member. This head supporting member is molded as-one with a pair of electrically conductive members comprised of a substantially parallel arrangement of a head supporting portion carrying a magnetic head device, a stationary portion for mounting the magnetic head device in the optical disc recording/reproducing apparatus and a head support arranged between the head mounting portion and the stationary portion.

With the head supporting member, an electrically conductive member is exposed to outside between the stationary portion and the head support to constitute a first resilient flexible portion, while an electrically conductive material is exposed to outside between the head support and the head mounting portion to constitute a second resilient flexible portion.

In the magnetic head device, a slide contact member is mounted on a surface of the magnetic head device facing the magneto-optical disc. This slide contact member slides on the rotated magneto-optical disc to maintain a pre-set separation between the magnetic head device and the magneto-optical disc.

If, with the magnetic head device, the rotated magneto-optical disc is subjected to surface deviations, the first and second resilient flexible portions are resiliently displaced to pivot the head mounting portion and the head support to maintain the posture of the magnetic head device and the slide contact member mounted thereon.

The magnetic head device also carries a flexible wiring board operating as wiring for supplying the current to the coil of the magnetic head device.

In this flexible wiring board, the wiring formed of an electrically conductive material designed as a printed circuit is sandwiched between a pair of flexible insulating films. The flexible wiring board has its one end connected to an external circuit, while having its other end connected to a terminal electrically connected to the coil formed on the head support member for electrically connecting the coil to the external circuit for supplying the current to the coil.

This magnetic head device has the coil terminal connected to the external circuit via the flexible wiring board to make possible current supply to the coil and movement of the hard disc simultaneously along the radius of the disc in synchronism with the optical pickup device.

Meanwhile, with this sort of the magnetic head device, it is necessary, when the magneto-optical disc is run in rotation with the slide contact member in sliding contact with the magneto-optical disc, to perform control so that, even in cases wherein the magneto-optical disc undergoes surface deviations, the slide contact member will maintain a pre-set slide contact posture at all times with the magneto-optical disc. That is, if, when the magneto-optical disc is subjected to the surface deviations, the posture of the slide contact member is in disorder, the separation between the magnetic head device and the magneto-optical disc is transiently broadened to disable correct application of the external magnetic field to cause recording failure.

Also, if the posture of the slide contact member is in disorder, there is a risk of the end of the slide contact member damaging the rotated magneto-optical disc.

In particular, in a portable photomagnetic recording/reproducing apparatus, there are occasions wherein the magneto-optical disc undergoes severe surface deviations due to vibrations applied thereto during use. Thus, it is desired of the magnetic head device that, even if the magnetic head device has changed its height position significantly to follow up with the surface deviations of the magneto-optical disc, the slide contact member can maintain a pre-set posture in order to have slide contact with the magneto-optical disc to enable correct application of the external magnetic field.

In addition, with this magnetic head device, there are occasions wherein, when the magnetic head device is moved radially of the disc in synchronism with the optical pickup device, the flexible wiring plate is slidingly contacted with the head support member or other components of the magneto-optical disc recording/reproducing apparatus to cause destruction of the flexible wiring board. Furthermore, when the magnetic head device is moved axially of the disc in synchronism with the optical pickup device, the flexible wiring board is flexed severely to become entangled with the head support member or driving gears in the device to obstruct smooth movement of the head device.

Thus, with the present magnetic head device, the flexible wiring plate is secured, such as with an adhesive, to the head support member to limit its width of flexure to prevent the flexible wiring board from being slidingly contacted or entwined with the head support member or other components.

However, the operation of securing the flexible wiring board to the head support member with an adhesive is cumbersome to lead to the lowering of productivity of the magnetic head device. Moreover, new components, such as adhesives, are required to increase the number of components. There is also the risk of the flexible wiring board being detached from the head support member due to the lowering of the adhesive power of the adhesive.

Further, with the magneto-optical disc recording/reproducing apparatus employing the above-described magnetic head device, the head mounting portion and the head support member need to be uplifted in a direction away from the major surface of the magneto-optical disc being loaded for providing a spacing for mounting/dismounting the magneto-optical disc.

Thus, with this magneto-optical disc recording/reproducing apparatus, a movement member is abutted against the lower surface of the head support member of the magnetic head device, so that, when mounting or dismounting the magneto-optical disc, this movement member is uplifted for pivoting the head mounting portion and the head support member in a direction away from the major surface of the magneto-optical disc being loaded for providing a spacing for attachment/detachment of the magneto-optical disc.

Further, this head device includes a pivoting amount regulating arm configured for being protruded from a stationary portion towards the head support member and the head mounting portion. This pivoting amount regulating arm includes a regulating piece adapted for compressing against the head mounting portion on pivoting of the head mounting portion and the head support member.

With this magnetic head device, when the head mounting portion and the head support member are pivoted in a direction away from the major surface of the loaded magneto-optical disc, the head mounting portion compresses against the regulating piece of the pivoting amount regulating arm to regulate superfluous pivoting of the head mounting portion and the head support member as well as to set the height position of the as-pivoted head mounting portion.

However, with this magnetic head device, the head mounting portion is abutted against the regulating piece of the pivoting amount regulating arm to regulate its pivoting, instead of the pivoting amount operating member abutted against the lower surface of the head support member uplifting the head support member for pivoting the head mounting portion and the head support member. Thus, if, with the head mounting portion compressing against the regulating piece of the pivoting amount regulating arm, an uplifting pressure is applied further, superfluous load tends to be concentrated in the second resilient flexible portion to cause its deformation.

With the magnetic head device, if the second resilient flexible portion is deformed, the slide contact posture of the magnetic head and the slide contact member with respect to the magneto-optical disc is in disorder to disable correct application of the external magnetic field.

SUMMARY OF THE INVENTION

It is therefore an object of the present invention to provide a magnetic head device in which, even if a magneto-optical disc run in rotation is subjected to surface deviations, the slide contact member can always maintain a pre-set slide contact posture with respect to the magneto-optical disc to make possible correct application of the external magnetic field.

It is another object of the present invention to provide a magnetic head device in which a flexible wiring board can be stably secured to the head support member without increasing the number of component parts to prevent the flexible wiring board from being slidingly contacted or entwined with other components in the device to enable a simplified mounting operation of the flexible wiring board to the head support member.

It is yet another object of the present invention to provide a magnetic head device in which excess pivoting of the head mounting portion and the head support member can be regulated without applying excess load on the second resilient flexible portion.

The present invention provides magnetic head device including resilient flexible portions on a head supporting member carrying a magnetic head device. These resilient flexible portions are pivotally displaced to follow up with surface deviations of the rotated magneto-optical disc to maintain the sliding posture of a slide contact portion mounted on the magnetic head element.

Specifically, the magnetic head device includes a pair of electrically conductive members arranged substantially parallel to each other, a head support member molded as-one with the electrically conductive members, a stationary portion molded as-one with the electrically conductive members at the proximal end of the head support member and a head mounting portion molded as-one with the electrically conductive members at the distal end of the head support member. The stationary portion serves for mounting the magnetic head device within a photomagnetic recording/reproducing apparatus, while the head mounting portion serving for carrying a magnetic head element.

The electrically conductive members face to outside between the head supporting member and the stationary portion to constitute first resilient flexible portions, while facing to outside between the head supporting member and the head mounting portion to constitute second resilient flexible portions.

The present magnetic head device is designed so that, when the magnetic head element has changed its height position to follow up with surface deviations of a rotated magneto-optical disc, the first resilient flexible portions and the second resilient flexible portions are resiliently displaced in opposite directions to maintain the slide contact posture of the magnetic head element and the slide contact portion attached thereto.

With the present magnetic head device, the first resilient flexible portions and second resilient flexible portions have spring constants set so that, if the magnetic head element has changed its height position to follow up with the surface deviations of the rotated magneto-optical disc, a point for which an angular change of the first resilient flexible portions 7, 7 is always equal to an angular change of the second resilient flexible portions 8, 8, that is an equilibrium point, will be present within the extent of a slide contact area. Thus, with the present magnetic head device, the external magnetic field can be applied correctly in stability without producing recording troubles otherwise caused by incorrect posture of the recording head.

Thus, with the present magnetic head device, if the rotated magneto-optical disc is subjected to relatively large surface deviations, such that the magnetic head element has changed its height position significantly in order to follow up with the surface deviations, the magnetic head element and the slide contact portion can have sliding contact with the magneto-optical disc at a constant posture.

The magnetic head device according to the present invention also includes a magnetic head element having a bobbin carrying a coil and a magnetic core at least partially inserted into a magnetic core inserting opening formed in the bobbin. The magnetic head device also includes a supporting member supporting the magnetic head element and a flexible wiring board for connecting the coil of the magnetic head element to an external circuit.

The supporting member has a holder for holding the flexible wiring board.

With the present magnetic head device, the flexible wiring board is limited in flexure width by having the flexible wiring board held by the holder to eliminate the risk of the flexible wiring board rubbing against or becoming entwined with the head supporting member or other components in the device.

The present invention also provides a magnetic head device including a pair of electrically conductive members arranged substantially parallel to each other, a head support member molded as-one with the electrically conductive members, a stationary portion molded as-one with the electrically conductive members at the proximal end of the head support member, and a head mounting portion molded as-one with the electrically conductive members at the distal end of the head support member. The stationary portion serves for mounting the magnetic head device within a photomagnetic recording/reproducing apparatus, while the head mounting portion serves for carrying a magnetic head element. The magnetic head device also includes first resilient flexible portions having electrically conductive members between the head supporting member and the head mounting portion for pivotally supporting the head mounting portion relative to the head supporting member, second resilient flexible portions including electrically conductive members between the head supporting member and the head mounting portion for pivotally supporting the head mounting portion relative to the head supporting member and a pivoting amount regulating member for regulating the pivoting amount of the head supporting member and the head mounting portion.

The pivoting amount regulating member includes a first regulating piece abutted against the head mounting portion for regulating the pivoting amount of the head mounting portion and a second regulating piece abutted against the head supporting member for regulating the pivoting amount of the head supporting member.

With the present magnetic head device, when the head mounting portion and the head supporting member are moved in a direction away from the loaded magneto-optical disc, the first regulating piece regulates the pivoting amount of the head mounting portion, whilst the second regulating piece regulates the pivoting amount of the head supporting member.

Thus, with the present magnetic head device, excess pivoting of the head mounting portion and the head supporting member can be regulated without application of an excess load on the second resilient flexible portions.

Also, with the present magnetic head device, since the flexible wiring board is secured to the holder by mounting the flexible wiring board on the holder provided on the supporting member, there is no necessity of using other components, such as adhesive. The flexible wiring board can be secured to the stationary portion by simply mounting the flexible wiring board on the holder, thus simplifying the operation to improve productivity.

BRIEF DESCRIPTION OF THE DRAWINGS

FIGS. 15A and B are back-side views of a magnetic head device according to the present invention wherein FIG. 15A is a back-side view of the magnetic head device prior to loading of the flexible wiring board and FIG. 15B is a back-side view of the magnetic head device subsequent to loading of the flexible wiring board.

DESCRIPTION OF PREFERRED EMBODIMENTS

Figure 1:
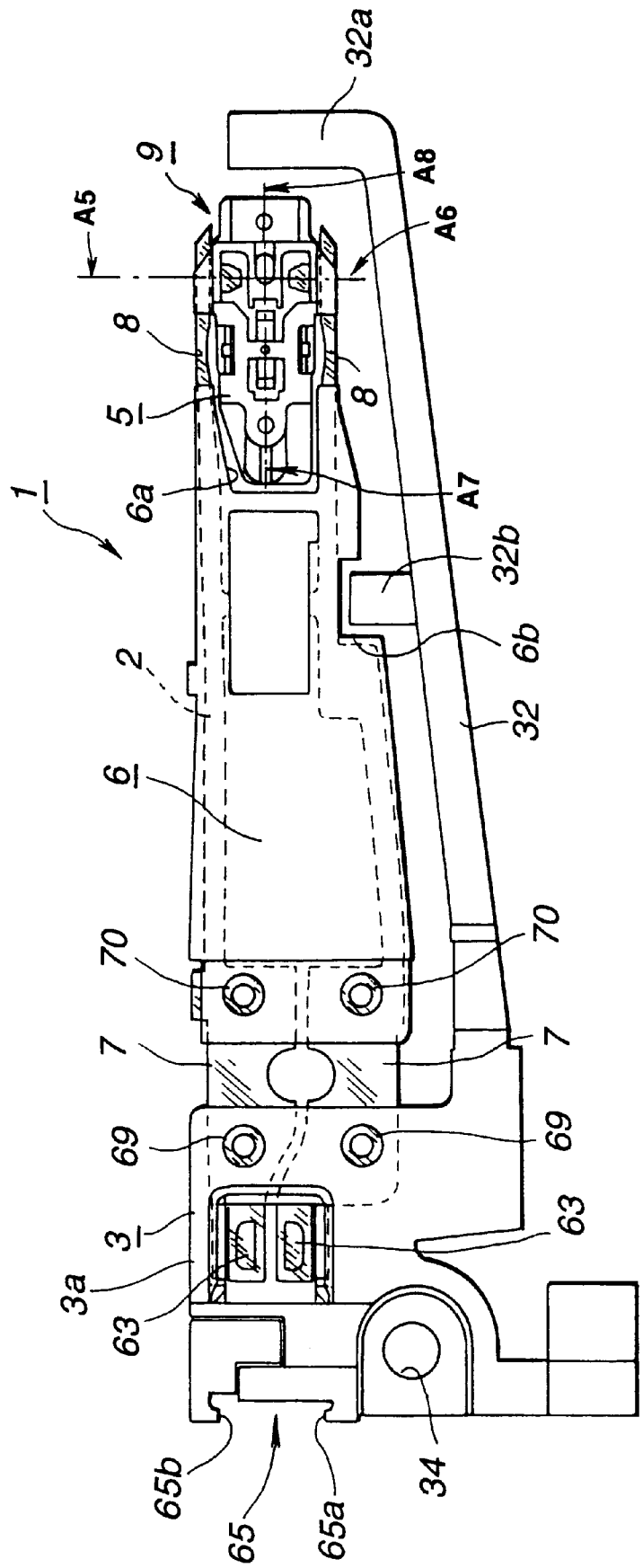
FIG. 1 is a plan view of a magnetic head device according to the present invention.

Referring to the drawings, preferred embodiments of the present invention will be explained in detail.

Figure 2:
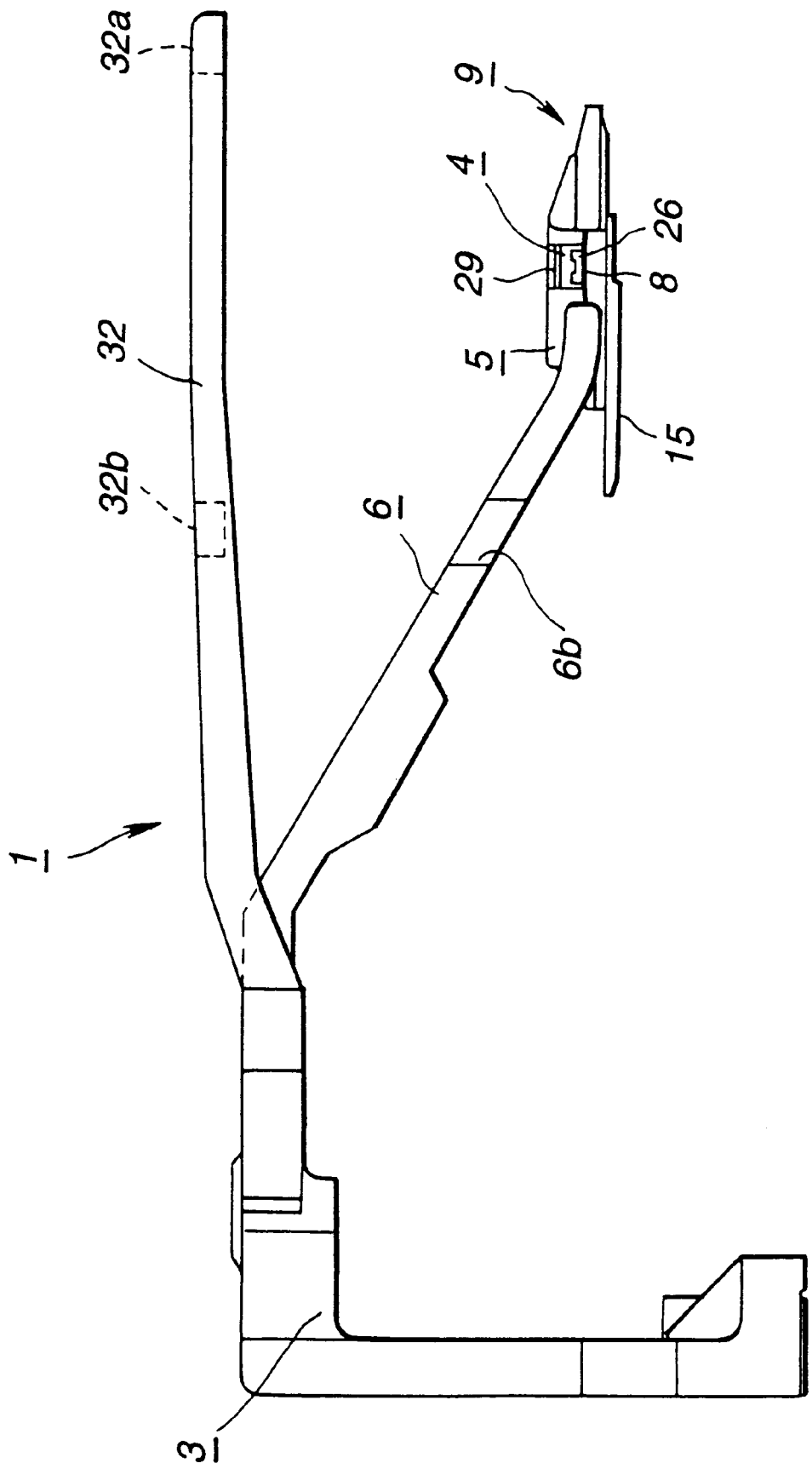
FIG. 2 is a side view of a magnetic head device according to the present invention.

A magnetic head device 1 embodying the present invention includes a pair of resilient elongated electrically conductive members 2, 2 arranged substantially parallel to each other, as shown in FIGS. 1 and 2. These electrically conductive members 2, 2 are obtained on punching and casting an electrically conductive thin metal plate of, for example, phosphor bronze or BeCu. In particular, the electrically conductive members 2, 2 are preferably prepared by casting an age-hardening material, such as BeCu, varied in ageing degree with the length of the heat-treatment time. By forming the electrically conductive members 2, 2 from the age-hardening material, the resilient force of the electrically conductive members 2, 2 may easily be set to a desired value.

On the distal ends of the electrically conductive members 2, 2, there is provided a feed terminal electrically connected to the coil of a magnetic head element 4 mounted on a head mounting portion 5 as will be explained subsequently. On the proximal ends of the electrically conductive members 2, 2 is mounted a terminal portion constituting an external circuit connecting portion connected to a flexible wiring board adapted for supplying current to the coil of the magnetic head device 4, as also explained subsequently.

On the proximal ends of the paired electrically conductive members 2, 2, a stationary portion 3 for mounting the magnetic head device 1 on a mounting block arranged in a photomagnetic recording/reproducing apparatus is formed integrally by molding a synthetic resin material. On the distal end of each of the paired electrically conductive members 2, 2, a head mounting portion 5, carrying a magnetic head device 4, made up of a magnetic core and a coil, for constituting a magnetic head 5, is integrally mounted by molding a synthetic resin material. Between the proximal end of the paired electrically conductive members 2, 2 carrying the stationary portion 3 and the distal ends thereof carrying the head mounting portion 5 is integrally mounted a head support member 6 by molding the synthetic resin material.

That is, the present magnetic head device 1 including the electrically conductive members 2, 2 connected to the coil of the magnetic head device 4, is formed with the stationary portion 3, head mounting portion 5 and the head support member 6 as supporting members molded as-one with the electrically conductive members 2, 2. The proximal end of the supporting member, that is the stationary portion 3, is secured to a mounting block arranged within the photomagnetic recording/reproducing apparatus. The magnetic head element 4 is arranged on the distal end of the supporting member, that is on the head mounting portion 5.

The head support member 6 is formed as-one with the mid portions of the paired electrically conductive members 2, 2 so that the paired electrically conductive members 2,2 are exposed to outside between the head support member 6 and the stationary portion 3 and so that the paired electrically conductive members 2,2 are exposed to outside between the head support member 6 and the head mounting portion 5.

The portions of the paired electrically conductive members 2, 2 exposed to outside between the stationary portion 3 and the head support member 6 operate as first resilient flexible portions 7, 7 operating as the center of pivoting of the head mounting portion 5 and the head support member 6 when the head mounting portion 5 and the head support member 6 are pivoted in the direction into contact with and away from the magneto-optical disc. The portions of the paired electrically conductive members 2, 2 exposed to outside between the head support member 6 and the head mounting portion 5 operate as second resilient flexible portions 8, 8 which are displaced in an opposite direction to the direction of displacement of the first resilient flexible portions 7, 7 when the head mounting portion 5 and the head support member 6 are pivoted in the direction into contact with and away from the magneto-optical disc. The second resilient flexible portions 8, 8 operate for maintaining the pre-set posture of the head mounting portion 5, magnetic head element 4 mounted thereon and a slice contact member 15 as later explained.

The magnetic head device 1 formed with a pivot amount regulating arm 32 adapted for regulating the pivoting amount of the head mounting portion 5 and the head support member 6 in a direction away from the magneto-optical disc. The pivot amount regulating arm 32 is formed for being projected from the stationary portion 3 towards the head support member 6 and the head mounting portion 5. By this pivot amount regulating arm 32, the magnetic head device 1 regulates the pivot amount of the head mounting portion 5 and the head support member 6, while setting the height position of the uplifted head mounting portion 5. Also, the magnetic head device 1 is designed so that, on projection on a plane, none of the portions of the head mounting portion 5, head support member 6 or the pivot amount regulating arm 32 are overlapped with one another on the projected plane, as shown in FIG. 1. With this disposition of the components of the magnetic head device 1, the magnetic head device 1 can be cast at a time using a set of upper and lower metallic molds.

The various components of the magnetic head device 1 are explained specifically in detail.

The head mounting portion 5, formed as-one with the distal ends of the paired electrically conductive members 2, 2, and the magnetic head element 4 mounted on the head mounting portion 5, are first explained.

On the head mounting portion 5 is mounted a magnetic head device 4, having a magnetic core and a coil, for constituting a magnetic head 9. When recording information signals on the magneto-optical disc, the magnetic head 9 is kept in sliding contact with one of the major surfaces of the rotating magneto-optical disc 9 in order to maintain the magnetic core of the magnetic head element 4 at a pre-set distance from the signal recording layer of the magneto-optical disc.

The magnetic head device 4, mounted on the head mounting portion 5 to constitute the magnetic head 9, is made up of a magnetic core 10, formed of a magnetic material, such as ferrite, and a bobbin 12, on which is wrapped a coil 11. The magnetic core 10, substantially E-shaped in its entirely, is made up of a center magnetic pole core 10a, a pair of side magnetic pole cores 10b, 10b, provided on both sides of the center magnetic pole core 10a and a connecting portion 10c interconnecting the proximal ends of the magnetic pole cores 10a to 10c. The center magnetic pole core 10a of the magnetic core 10 is longer in length than the side magnetic pole cores 10b, 10b so that the distal end of the center magnetic pole core 10a is slightly protruded from the distal ends of the side magnetic pole cores 10a, 10b.

The bobbin 12, making up the magnetic head device 4 in cooperation with the magnetic core 10, is molded from a synthetic resin material capable of being molded to an extremely high precision, such as a liquid crystal polymer or polyphenylene sulfide. This bobbin 12 has, at its mid portion, a magnetic core inserting opening 13 into which is inserted the center magnetic pole core 10a of the magnetic core 10, as shown in FIGS. 3 to 6. Around this magnetic core inserting opening 13 is formed a recessed coil winding portion. The bobbin 12 has its end portion formed as-one with a flange 14 projected in a direction perpendicular to the axis of the magnetic core inserting opening 13. The flange 14 has a lower side surface 14a as a surface facing the major surface of the magneto-optical disc.

Figure 4:
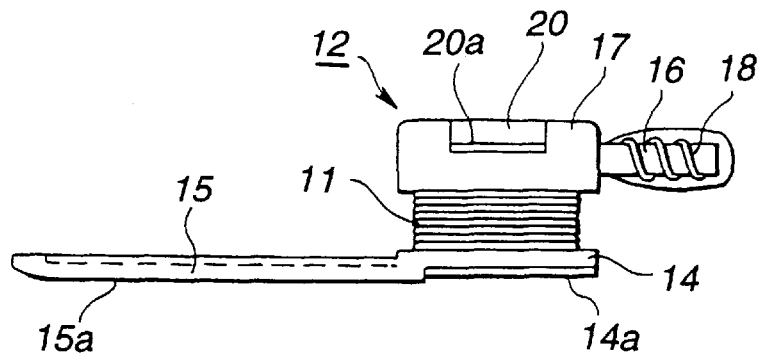
FIG. 4 is a side view showing a bobbin and a coil making up the magnetic head device.
Figure 5:
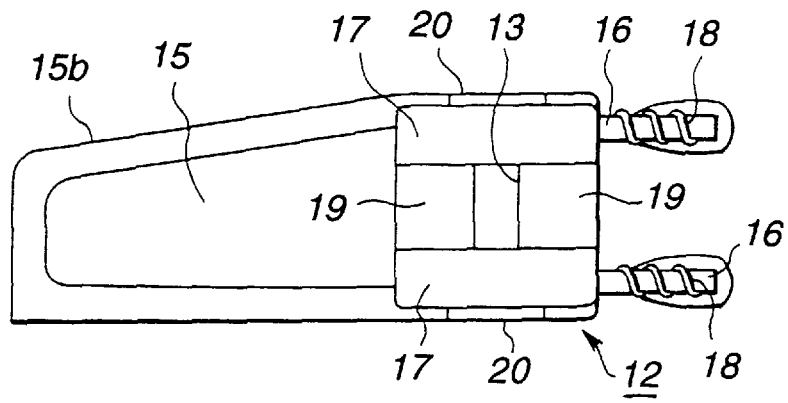
FIG. 5 is a plan view showing a bobbin and a coil making up the magnetic head device.
Figure 6:
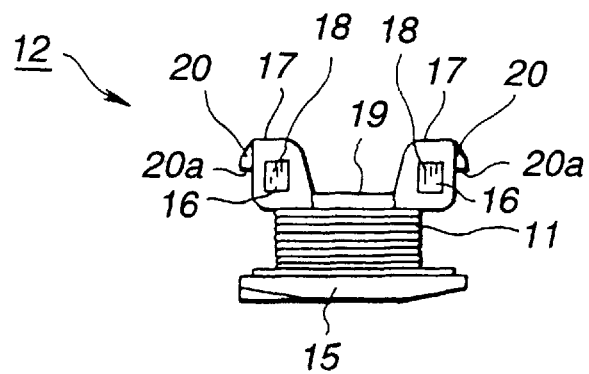
FIG. 6 is a front view showing a bobbin and a coil making up the magnetic head device.

From one end of the flange 14 is protruded a slide contact portion 15 towards the stationary portion 3 of the supporting member. The slide contact portion 15 is adapted to have a sliding contact with the major surface of the magneto-optical disc. The slide contact portion 15 has a slide contact surface 15a slightly projected from the lower side surface 14a facing the major surface of the magneto-optical disc in order to have a sliding contact with the major surface of the magneto-optical disc, as shown in FIG. 4. Specifically, the bobbin 12 has, in the vicinity of the magnetic core inserting opening 13, a step difference between the lower side surface 14a facing the major surface of the magneto-optical disc and surface facing the major surface of the magneto optical disc in the slide contact surface 15a of the slide contact portion 15, such that, when the slide contact portion 15 has a sliding contact with the magneto-optical disc, a preset gap is defined between the vicinity of the magnetic core inserting opening 13 and the magneto-optical disc.

The side of the slide contact portion 15 positioned towards the outer rim of the magneto-optical disc when the magnetic head 9 is formed as an inclined portion 15b extending along the outer rim of the magneto-optical disc when the magnetic head 9 has a sliding contact with the magneto-optical disc. Thus, when the magnetic head 9 is moved in sliding contact with the rotated magneto-optical disc, the slide contact surface 15a of the slide contact portion 15 has a smooth sliding contact with the entire surface of the magneto-optical disc inclusive of its outer rim portion.

On the opposite side of the bobbin 12 are protuberantly formed a pair of terminal supporting portions 17, 17 adapted for supporting a pair of coil connection terminals 16, 16 formed of an electrically conductive material, such as phosphor bronze. These terminal supporting portions 17, 17 are formed in parallel for facing each other for extending in a direction perpendicular to the axial direction of the magnetic core inserting opening 13. The paired coil connection terminals 16, 16 are flush-mounted as-one with the terminal supporting portions 17, 17 by having one ends protruded from the terminal supporting portions 17, 17. It is noted that the paired coil connection terminals 16, 16 are mounted as one with the terminal supporting portions 17, 17 simultaneously with the casting of the terminal supporting portions 17, 17 when the bobbin 12 is cast by a metallic mold. Specifically, the coil connection terminals 16, 16 are mounted on the terminal supporting portions 17, 17 by so-called insert-molding.

On the coil connection terminals 16, 16 are placed several turns of connection terminals 18, 18 of the coil 11 placed around the bobbin. For assuring reliable electrical connection between the connection terminals 18, 18 and the coil connection terminals 16, 16, the connection terminals 18, 18 are connected to the coil connection terminals 16, 16 using an electrically conductive adhesive or a solder.

The paired terminal supporting portions 17, 17 are mounted facing each other for defining two recesses 19, 19 in the bobbin 12 which operate as a fitting portion for the magnetic core 10.

On one side towards the upper ends of the terminal supporting portions 17, 17 are formed engagement pawls 20, 20 as engagement portions engaged in an engagement step formed in a mounting hole formed in the head mounting portion 15 for operating as a mating engagement portion. The engagement pawls 20, 20 are engaged in the mating engagement portion when the bobbin 12 is fitted in the mounting hole provided in the head mounting portion 5. These engagement pawls 20, 20 are formed for extending along the axis of the magnetic core inserting opening 13 provided in the bobbin 12 and are formed with terminal engagement pawl portions 20a, 20a.

The head mounting portion 5, carrying the magnetic core 10 and the bobbin 12 for constituting the magnetic head device 4, is formed by molding an electrically non-conductive synthetic resin material, and carries a magnetic head element 4 at its mid portion, as shown in FIGS. 3 and 7–9.

The head mounting portion 5 is formed with a mounting hole 21 into which are fitted the magnetic core 10 and the bobbin 12. This mounting hole 21 is a blind hole opened on the surface facing the magneto-optical disc. On facing longitudinal sides of the mounting hole 21 are protuberantly formed first clamp elements 22, 22 and second clamp elements 23, 23 for clamping the side magnetic pole cores 10b, 10b of the magnetic core 10 inserted into the mounting hole 21. These clamp elements 22, 22 and 23, 23 are protruded from the longitudinal facing surfaces of the mounting hole 21 for facing one another. The spacing between the first clamp elements 22, 22 and that between the second clamp elements 23, 23 are selected to be slightly narrower than the thickness of the magnetic core 10. The clamp elements 22, 22 and 23, 23 are adapted to hold compressingly the side magnetic pole cores 10b, 10b of the magnetic core 10 inserted into the mounting hole 21.

On both lateral sides of the mounting hole 21 are formed engagement step differences 24, 24 operating as mating engagement portions engaged by the engagement pawl portions 20a, 20a of the engagement pawls 20, 20 provided on the bobbin 12 for insertion into the mounting hole 21. These engagement step differences 24, 24 are formed at upper end face portions of resilient flexible portions 26, 26 formed by forming substantially U-shaped slits 25, 25 in the longitudinally facing sides of the mounting hole 21 from the bottom side of the mounting hole 21, that is from the upper surface side of the head mounting portion 5. That is, the engagement step differences 24, 24 are formed by the slits 25, 25 formed in the longitudinally facing surfaces of the mounting hole 21 and are constituted by portions of the resilient flexible portions 26, 26.

On one and the opposite ends of the upper surfaces of the engagement step differences 24, 24 formed by portions of the resilient flexible portions 26, 26, that is on the surfaces thereof engaged with the engagement pawl portions 20a, 20a formed on the bobbin 12, there are formed projections 24a, 24a and similar projections 24b, 24b, respectively. The upper sides of the projections 24a, 24a and 24b, 24b are planar so that the engagement pawl portions 20a, 20a engaged with the engagement step differences 24, 24 are abutted against the engagement step differences 24, 24 with the upper sides of the projections 24a, 24a and 24b, 24b.

Since the two projections 24a, 24a and 24b, 24b are formed on the upper sides of the engagement step differences 24, 24, the bobbin 12 can be made parallel to high precision to the head mounting portion 5.

Figure 9:
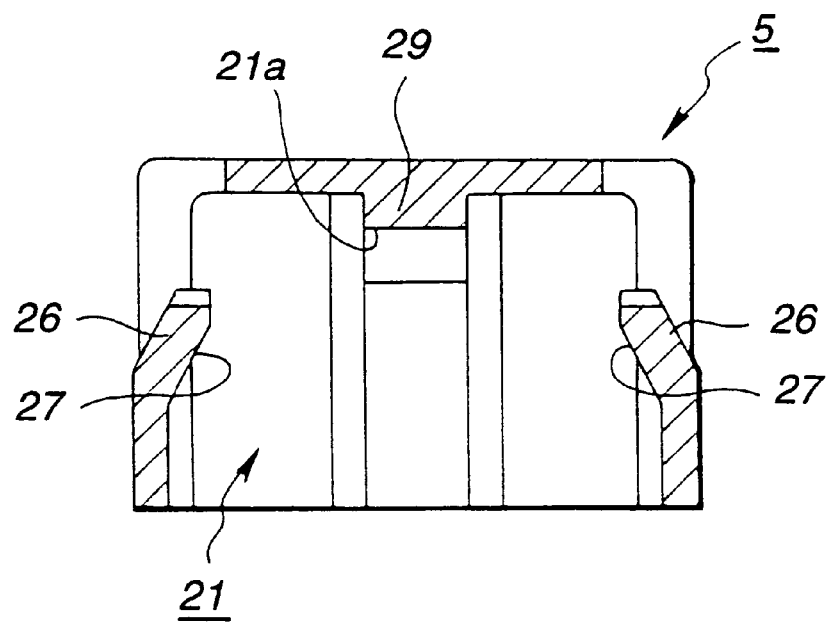
FIG. 9 is a cross-sectional view taken along line A3 to A4 of FIG. 7.

The upper ends of the resilient flexible portions 26, 26, formed with the engagement step differences 24, 24 by forming the slits 25, 25 for forming the engagement step differences 24, 24, are inclined for being protruded towards the inside of the mounting hole 21, as shown in FIG. 9. The inclined facing surfaces of the resilient flexible portions 26, 26 formed as insertion guides 27, 27 are abutted against a portion of the outer rim of the bobbin 21 inserted into the mounting hole 21.

Figure 7:
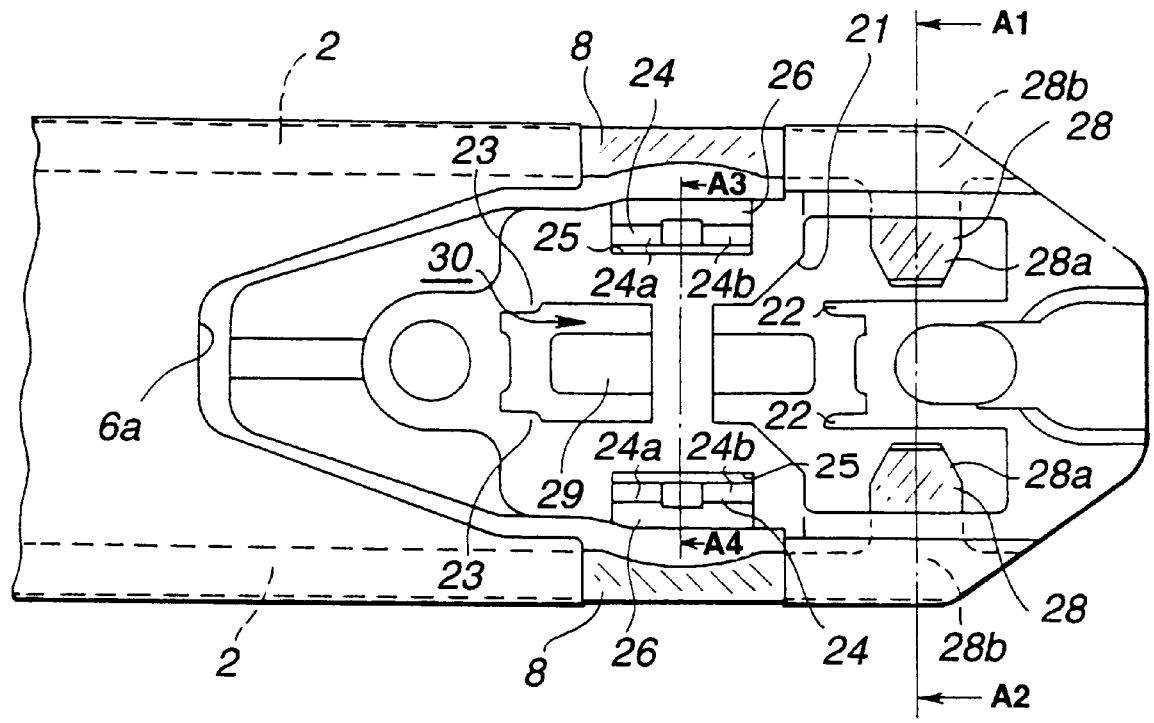
FIG. 7 is a plan view of a head mounting portion.
Figure 8:
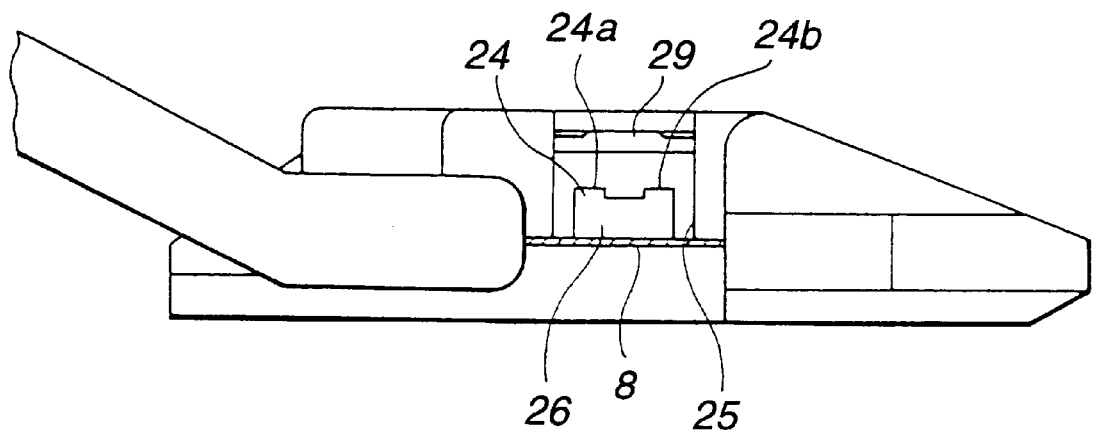
FIG. 8 is a side view of a head mounting portion.
Figure 10:
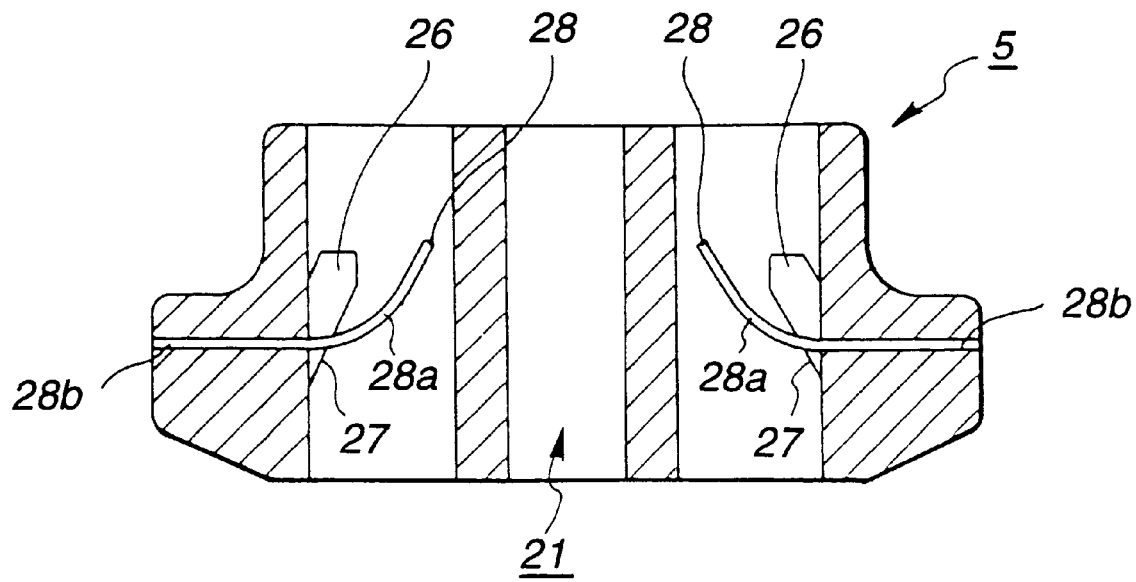
FIG. 10 is a cross-sectional view taken along line A1 to A2 of FIG. 7.
Figure 11:
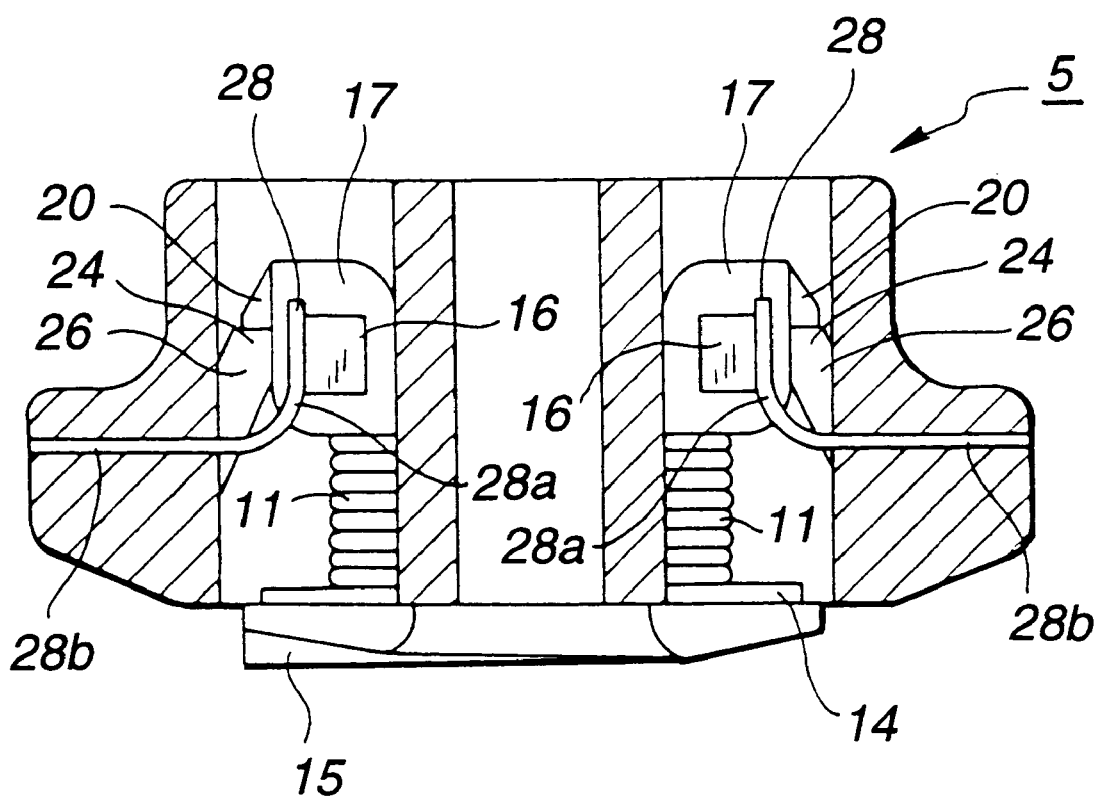
FIG. 11 is a cross-sectional view taken along line A5 to A6 of FIG. 1.

In the mounting hole 21 are protuberantly formed current-supplying terminals 28, 28 formed by warping the distal ends of the paired electrically conductive members 2, 2, as shown in FIG. 10. These current-supplying terminals 28, 28 are designed to supply the current to the coil 11 placed around the bobbin 12 inserted into the mounting hole 21. These current-supplying terminals 28, 28 are adapted for being electrically connected to the coil connection terminals 16, 16 about which are placed connection terminals 18, 18 of the coil 11. These current-supplying terminals 28, 28 are provided at such positions that, when the bobbin 12 is mounted in the mounting hole 21, the current-supplying terminals 28, 28 can be contacted with the coil connection terminals 16, 16 about which are wound the connection terminals 18, 18 of the coil 11 wound in turn about the bobbin 12. The current-supplying terminals 28, 28 are protuberantly formed on the facing lateral sides of the mounting hole 21 on the side of protrusion of the first clamp elements 22, 22 as shown in FIG. 7.

The current-supplying terminals 28, 28, formed by warping the distal ends of the paired electrically conductive members 2, 2, are provided with warped portions 28a, 28a and molded portions 28b, 28b as shown in FIG. 10. The warped portions 28a, 28a are protruded into the mounting hole 21 for being resiliently contacted with the coil connection terminals 16, 16. The molded portions 28b, 28b are molded from the head mounting portion 5 formed of the synthetic resin. The warped portions 28a, 28a are formed by warping the current-supplying terminals 28, 28 from one ends of the head mounting portion 5 along the direction of insertion of the bobbin 21 into the mounting hole 21. It is by the stress produced by this warping that the current-supplying terminals 28, 28 are elastically contacted with the coil connection terminals 16, 16.

The portions of the warped portions 28a, 28a at least of the current-supplying terminals 28, 28 contacted with the coil connection terminals 16, 16 are processed with plating, such as gold plating, nickel plating or soldering for reducing the electrical resistance during contact. The materials used for plating is preferably a material having an electrical resistance smaller than that of the current-supplying terminals 28, 28. Similarly, the portions of the coil connection terminals 16, 16 contacted with the warped portions 28a, 28a are preferably processed with plating, such as gold plating, nickel plating or soldering, for reducing the electrical resistance during contact.

On the bottom surface 21a of the mounting hole 21, that is on the inner surface towards the top plate of the head mounting portion 5, there is protuberantly formed a thrusting member 29 for thrusting the magnetic core 10 towards the magneto-optical disc, as shown in FIGS. 3 and 7 to 9. The thrusting member 29 is elastic and compresses against the connecting portion 10c of the magnetic core 10 of the magnetic head element 4 mounted in the mounting hole 21 to thrust the magnetic core 10 towards the magneto-optical disc. That is, both ends 29a, 29b of the thrusting member 29 are abutted against the connecting portion 10c of the magnetic core 10 to thrust the magnetic core 10 towards the magneto-optical disc.

In the magnetic head device of the present embodiment 1, as described above, the magnetic head element 4 is secured by the engagement pawls 20, 20 formed in the bobbin 12 engaging in the engagement step differences 24, 24 formed in the head mounting portion 5 and by the magnetic core 10 being thrust by the thrusting member 29 formed on the head mounting portion 5 towards the magneto-optical disc.

Meanwhile, there is formed a gap 30 around the thrusting member 29, as shown in FIG. 7, such that the magnetic core 10 thrust by the thrusting member 29 is exposed to outside via this gap 30. Since the state of the magnetic core 10c can be checked in this manner from outside, defective magnetic head devices, suffering from, for example, breakage of the magnetic core, can be detected instantly.

The process for assembling the above-described magnetic head 9 and the assembled magnetic head 9 will be explained in detail.

Figure 3:
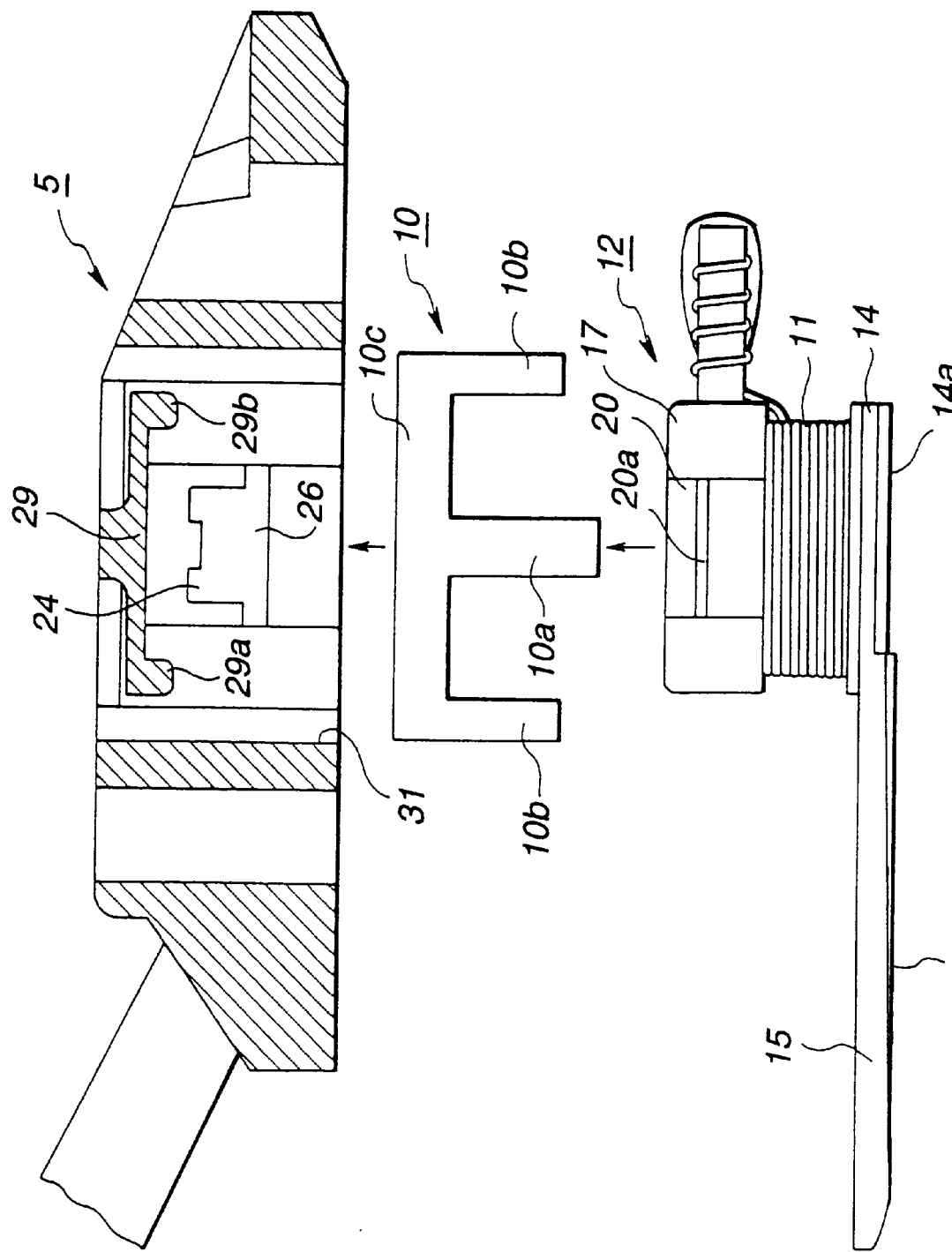
FIG. 3 is an exploded cross-sectional view of a magnetic head of the magnetic head device according to the present invention.

For assembling the magnetic head 9, the magnetic core 10 is mounted in position in the mounting hole 21 of the head mounting portion 5. The magnetic core 10 is inserted into the mounting hole 21, with the connecting portion 10c as the inserting end, beginning at an opening end 31 of the head mounting portion 5 opened to the magneto-optical disc, as shown in FIG. 3. The magnetic core 10, inserted into the mounting hole 21, is provisionally secured in the mounting hole 21 by being clamped between the first clamp elements 22, 22 and the second clamp elements 23, 23, by having both sides of the side magnetic pole cores 10b, 10b fitted between the clamp elements 22, 22 and 23, 23. At this time, the upper surface of the magnetic core 10 compresses against the thrusting member 29.

The bobbin 12, about which the coil 11 is placed, is inserted into the mounting hole 21 in which is placed the magnetic core 10. The bobbin 12 is inserted into the mounting hole 21 from the opening end 31, with the sides of the engagement pawls 20, 20 being in register with the surface of the mounting hole 21 formed with the engagement step differences 24, 24 and with the coil connection terminals 16, 16 being in register with the current-supplying terminals 28, 28 protuberantly formed in the mounting hole 21. At this time, the center magnetic pole core 10a of the magnetic core 10 is inserted into the magnetic core inserting opening 13 of the bobbin 12. As the bobbin 12 is progressively inserted into the mounting hole 21, the bobbin 12 is inserted into the mounting hole 21, as the outer lateral sides of the bobbin 12 carrying the coil connection terminals 16, 16 are kept in sliding contact with the insertion guides 27 formed on opposite sides of the resilient flexible portions 26, 26 projected into the mounting hole 21. At this time, the bobbin 12 has its outer lateral sides guided by the insertion guides 27, 27 as it is inserted into the mounting hole 21 to regulate the direction of insertion into the mounting hole 21. Thus, the bobbin 12 is progressively introduced into the mounting hole 21 in a state in which the center magnetic pole core 10a of the magnetic core 10 provisionally secured in the mounting hole 21 is correctly inserted into the magnetic core inserting opening 13.

Figure 12:
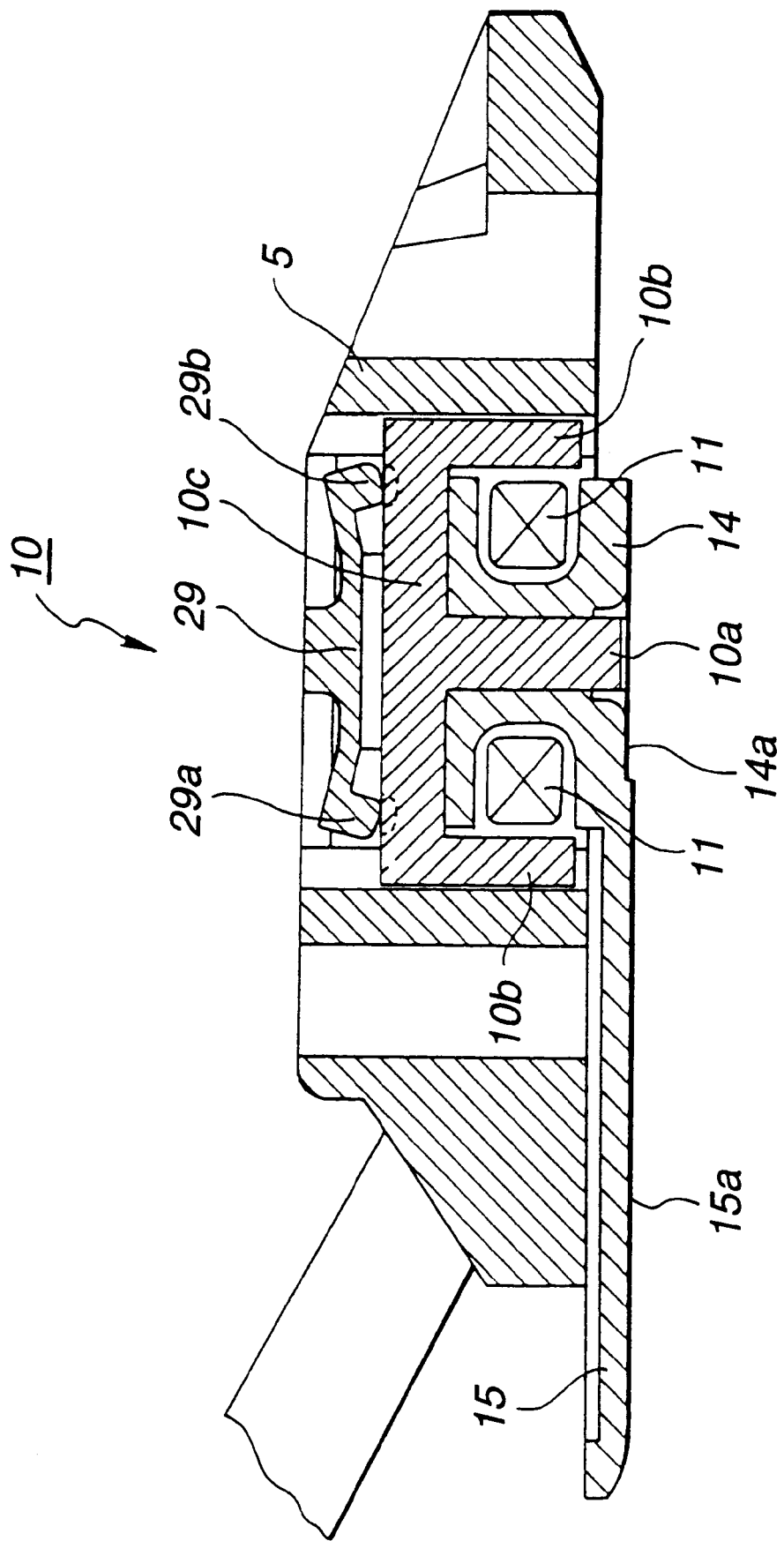
FIG. 12 is a cross-sectional view taken along line A7 to A8 of FIG. 1.

Also, when the bobbin 12 is introduced into the mounting hole 21, the resilient flexible portions 26, 26 are resiliently displaced outwardly of the mounting hole 21 by the engagement pawls 20, 20. If the bobbin 12 is inserted further from this point, the engagement pawl portions 20a, 20a at the distal ends of the engagement pawls 20, 20 arrive at the engagement step differences 24, 24 formed at the distal ends of the resilient flexible portions 26, 26 to realize the engagement of the engagement pawls 20, 20 with the engagement step differences 24, 24. The bobbin 12 is thrust at this time towards the magneto-optical disc by the thrusting member 29 via the magnetic core 10, as shown in FIG. 12. Thus, the bobbin 12 is mounted and secured in position in the mounting hole 21 so that the flange 14 will face the side of the head mounting portion 5 facing the magneto-optical disc.

When the bobbin 12 is mounted in position in the mounting hole 21, the coil connection terminals 16, 16 compress against the current-supplying terminals 28, 28 projected in the mounting hole 21 to establish electrical connection between the coil 11 and the electrically conductive members 2, 2. These current-supplying terminals 28, 28 are provided with the resilient warped portions 28a, 28a which are abutted against the coil connection terminals 16, 16 such as to apply the elastic force thereto to assure reliable electrical connection.

The magnetic head 9, assembled as described above, can be assembled simply by sequentially introducing the magnetic core 10 and the bobbin 12 carrying the coil 11 into the mounting hole 21. Since there is no necessity of using an adhesive for securing the magnetic core 10 and the coil 11 on the head mounting portion 5, the assembling operation can be simplified significantly. Moreover, since the mounting position of the magnetic head element 4 relative to the head mounting portion 5 is determined by the relative engagement position between the engagement pawls 20a and the engagement step differences 24, 24, the mounting position can be set easily and accurately. Moreover, with the present magnetic head 9, no solder is required for interconnecting the coil connection terminals 16, 16 provided on the bobbin 16 and the coil connection terminals 16, 16, thus significantly simplifying the assembling operation for the magnetic head 9.

It is noted that, in the present magnetic head 9, there is provided a step difference between a surface in the vicinity of the magnetic core inserting opening 13 facing the major surface of the magneto-optical disc and a surface of the slide contact portion 15 facing the major surface of the magneto-optical disc, such that, when the slide contact portion 15 has a sliding contact with the magneto-optical disc, there is formed a pre-set gap between the vicinity of the magnetic core inserting opening 13 and the magneto-optical disc.

Thus, when the slide contact portion 15 has a sliding contact with the magneto-optical disc, the gap between the center magnetic pole core 10a of the magnetic core 10 inserted into the magnetic core inserting opening 13 and the magneto-optical disc is determined by the above step difference, the height of the bobbin 12 in the axial direction of the magnetic core inserting opening 13, and by the length of the center magnetic pole core 10a from the center magnetic pole core 10a to the magneto-optical disc. Therefore, if the bobbin 12 and the magnetic core 10 are formed to high accuracy, the gap between the center magnetic pole core 10a and the magneto-optical disc, that is the amount of float of the magnetic core 10 on the magneto-optical disc, can be held at a pre-set value to high accuracy.

Stated differently, the amount of float of the magnetic core 10 over the magneto-optical disc in the present magnetic head device 1 is regulated solely by the shape of the bobbin 12 and the magnetic core 10. Therefore, in the present magnetic head device 1, particularly high machining accuracy is demanded solely of the bobbin 12 and the magnetic core 10. There is required no high machining accuracy for the support comprised of the stationary portion 3, head support member 6 and the head mounting portion 5 molded integrally with the electrically conductive members 2, 2. That is, there is required no high accuracy as for the metal mold used for casting the support of the magnetic head device 1, thus facilitating manufacture of the support.

The head support member 6, supporting the above-described magnetic head 9 on its distal end via second resilient flexible portions 8, 8, is hereinafter explained.

The head support member 6 is formed by integrally molding the synthetic resin across the paired electrically conductive members 2, 2. Since the head support member 6 is formed by integrally molding the synthetic resin across the paired electrically conductive members 2, 2, the head support member 6 secures the relative positions of the paired electrically conductive members 2, 2, while imparting toughness to the paired electrically conductive members 2, 2. The head support member 6 also supports the head mounting portion 5, constituting the magnetic head 9 mounted at the distal ends of the electrically conductive members 2, 2, for pivoting freely about the second resilient flexible portions 8, 8 as the center.

When not pivoted, the head support member 6 is arranged obliquely from the stationary portion 3 towards the head mounting portion 5 so that the head support member 6 progressively approaches the loading position of the magneto-optical disc.

In the side of the head support member 6 carrying the head support member 6, there is formed a first cut-out 6a faced by the slide contact portion 15 of the magnetic head element 4 mounted on the head mounting portion 5, as shown in FIG. 1. When pivoted about the second resilient flexible portions 8, 8, the head mounting portion 5 is pivoted so that the slide contact portion 15 will be intruded into the first cut-out 6a of the head support member 6.

In the lateral side of the head support member 6 neighboring to the pivot amount regulating arm 32 of the head support member 6 is formed a second cut-out 6b operating for preventing a second regulating piece 32b of the pivot amount regulating arm 32 as later explained from being overlapped with the head support member 6 when the magnetic head device 1 is cast on a plane.

Since the stationary portion 3, pivot amount regulating arm 32, head mounting portion 5 and the head support member 6 are molded simultaneously by injecting and molding the synthetic resin material into a cavity of a metal mold device containing the paired electrically conductive members 2, 2, by way of insert molding, the magnetic head device 1 can be molded by upper and lower paired metallic molds by having the second regulating piece 32b of the pivot amount regulating arm 32 not overlapped with the head support member 6 when the magnetic head device is projected on a plane, thereby improving the production efficiency of the magnetic head device.

The stationary portion 3, provided on the distal ends of the paired electrically conductive members 2, 2, is specifically explained.

This stationary portion 3, used for fixedly supporting the magnetic head device 1 on a mounting block, movable in synchronism with the optical pickup device arranged in the photomagnetic recording/reproducing apparatus, is made up of a molded portion 3a, molded as-one with the electrically conductive members 2, 2, and a base portion 3b, set upright on the molded portion 3a for setting the relative position of the magnetic head device 1 relative to the optical pickup device.

This stationary portion 3 is secured to the mounting block by passing a stationary member, such as a set screw, into a stationary member inserting hole 34 bored in one end of the base portion 3b. In the bottom surface of the base portion 3b are formed engagement recesses engaged by a pair of positioning pins mounted on the mounting block. The stationary portion 3 is positioned relative to the mounting block by engagement of the positioning pins in the engagement recesses.

Figure 13:
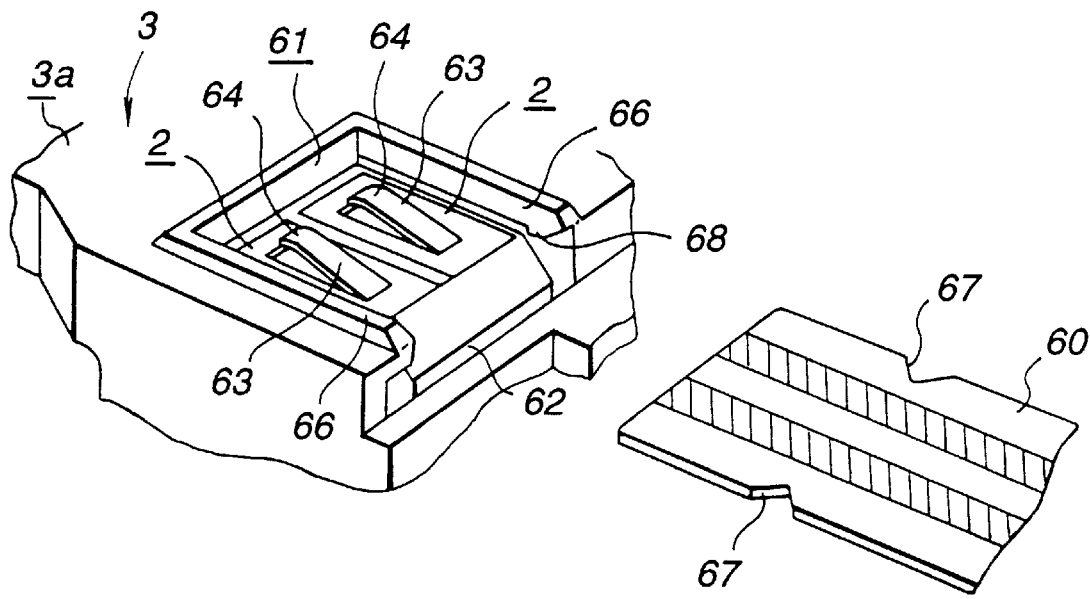
FIG. 13 is a perspective view showing an external circuit connecting portion provided in a stationary portion.
Figure 14:
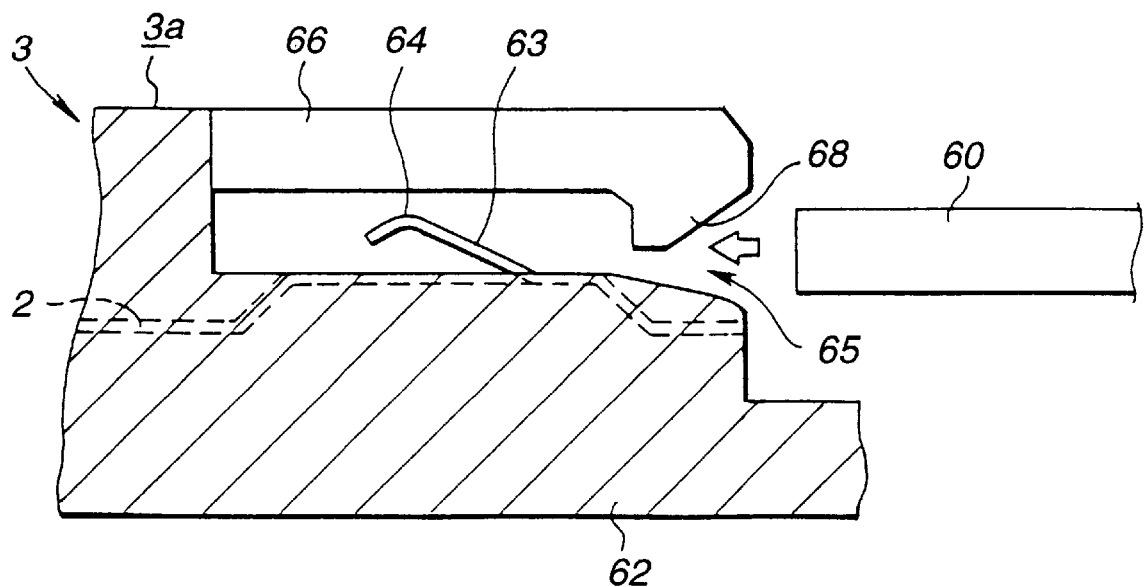
FIG. 14 is a cross-sectional view showing the external circuit connecting portion.

The molded portion 3a of the stationary portion 3 is provided with an external circuit connecting portion 61 to which is connected a flexible wiring board 60 adapted for electrically connecting to the external circuit the magneto-optical disc element 4 mounted on the head mounting portion 5 supported on the distal end of the head support member 6, as shown in FIGS. 1, 13 and 14. The external circuit connecting portion 61 has a terminal portion supporting piece 62 protuberantly formed on the distal end of the molded portion 3a integrally molded with the electrically conductive members 2, 2.

On one of the major surfaces of the terminal portion supporting piece 62 are extended terminal portions 63, 63 formed at the proximal ends of the paired electrically conductive members 2, 2.

These terminal portions 63, 63 are formed by forming substantially U-shaped tapered slits in the paired electrically conductive members 2, 2 electrically connected to the coil 11 of the magnetic head element 4 via current-supplying terminals 28, 28, and are adapted to be resiliently displaced about the connecting portions to the electrically conductive members 2, 2 as center. The terminal portions 63, 63 are warped for being protruded over the terminal portion supporting piece 62 and are formed at the distal ends thereof with bent portions 64, 64. Thus, when the bent portions 64, 64 protruded on the terminal portion supporting piece 62 are thrust, the terminal portions 63, 63 are resiliently displaced towards the terminal portion supporting piece 62 about the connecting portions to the electrically conductive members 2, 2 as fulcrum points.

The terminal portion supporting piece 62 is formed with a cut-out opening into which the distal ends of the terminal portions 63, 63 are intruded on resilient displacement of the terminal portions 63, 63.

The opposite sides of the terminal portion supporting piece 62 are provided with a pair of flexible wiring board supporting pieces 66, 66 for forming, in cooperation with the terminal portion supporting piece 62, an insertion groove 65 in which to insert the flexible wiring board 60 electrically connected to the terminal portions 63, 63. These flexible wiring board supporting pieces 66, 66 are formed so as to be protruded from the stationary portion 3 on the terminal portion supporting piece 62, and delimit the insertion groove 65 in cooperation with the terminal portion supporting piece 62. On the lower surfaces of the flexible wiring board supporting pieces 66, 66 is formed a retention pawl 68 engaged in cut-out grooves 67, 67 formed in both lateral sides of the flexible wiring board 60 inserted into the insertion groove 65.

The flexible wiring board 60 is inserted into the insertion groove 65 from its distal end so as to be connected to the external circuit connecting portion 61 as the flexible wiring board is clamped between the terminal portion supporting piece 62 and the flexible wiring board supporting pieces 66, 66. The flexible wiring board 60 is flexibly deformed at this time to cause a connecting pattern portion to be abutted against the terminal portions 63, 63 extended over the terminal portion supporting piece 62. By the connection pattern compressing against the terminal portions 63, 63, the flexible wiring board 60 is electrically connected to the paired electrically conductive members 2, 2. The coil 11 of the magnetic head element 4 is electrically connected via paired electrically conductive members 2, 2 and the flexible wiring board 60 to the external circuit to make possible current supply from an external circuit.

The paired terminal portions 63, 63 are plated by gold- or nickel-plating or soldering. Similarly, the current-supplying terminals 28, 28 formed on the paired electrically conductive members 2, 2 are processed with plating. By this processing with plating, the contact resistance of the terminal portions 63, 63 and the current-supplying terminals 28, 28 is reduced to realize optimum electrical contact.

The molded portion 3a, molded as-one with the electrically conductive members 2, 2 of the stationary portion 3, is formed with through-holes 69, 69 for partially exposing the electrically conductive members 2, 2, buried in the head support member 6, to outside. Similarly, the upper surface of the head support member 6 is formed with through-holes 70, 70 for partially exposing the resilient members 2, 2, buried in the head support member 6, to outside. The portions of the resilient members 2, 2 facing the through-holes 69, 69 and 70, 70 serve as contact portions of inspection devices used for inspecting the contacting state of the resilient members 2, 2 with the coil 11 of the magnetic head element 4 or the electrical properties of the magnetic head device 4.

The portions of the paired resilient members 2, 2 constituting the first resilient flexible portions 7, 7 and the second resilient flexible portions 8, 8 are plated with gold- or nickel-plating or soldering for rust-proofing these portions.

Figure 15A:
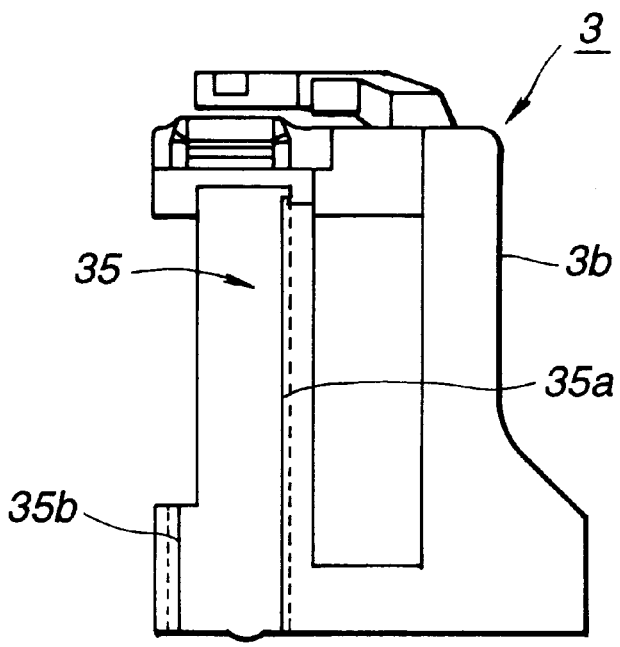
Figure 15B:
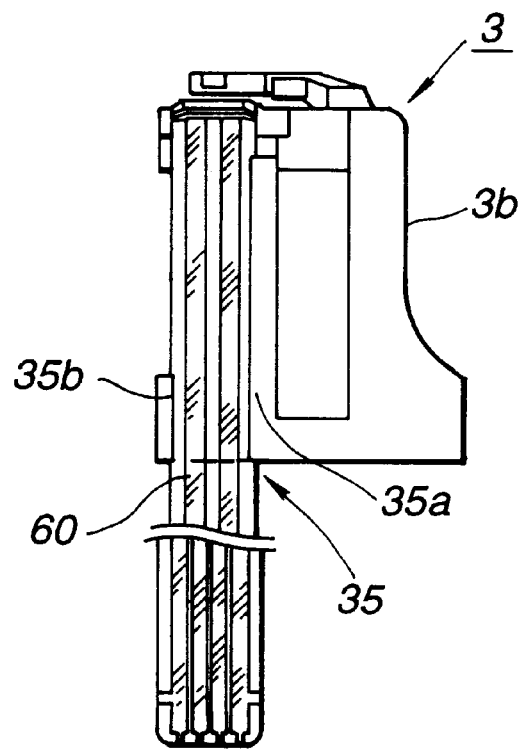

The stationary portion 3 is provided with a holding portion 35 for holding the flexible wiring board 60 in the longitudinal direction of the base portion 3b, as shown in FIGS. 15A and 15B.

The holder 35 has a holding groove 35a, into which a longitudinal end of the flexible wiring board 60 is inserted a pre-set length without interruptions, and a holding piece 35b for holding the opposite end portion in the longitudinal direction of the flexible wiring board 60 inserted into the holding groove 35a.

The holding groove 35a is formed in a lateral side wall surface of the recess formed to the substantially same width as the width of the flexible wiring board 60 in the longitudinal direction of one of the major surfaces of the base portion 3b. The holding piece 35b is formed for projecting from the other sidewall surface of the recess towards the holding groove 35a.

The other lateral wall of the recess is cut out and removed on the side of the molded portion 3 a formed as-one with the electrically conductive members 2, 2 of the base portion 3b. Thus, the holding piece 35b is formed at a portion of the base portion 3b formed with a stationary member inserting opening 34. The separation between the protuberant distal end of the lateral wall formed with the holding piece 35b and the holding groove 35a of the recess is selected to be narrower than the width of the flexible wiring board 60.

For loading the flexible wiring board 60 on the holding member 35, one end of the flexible wiring board 60 is pulled towards the side of the base portion 3b formed with the stationary member inserting opening 34, at the same time as the longitudinal end of the flexible wiring board 60 is introduced over a pre-set length into the holding groove 35b. With the major surface of the flexible wiring board 60 compressing against the bottom of the recess, part of the opposite longitudinal end portion of the flexible wiring board is pushed onto the lower side of the holding piece 35b.

At this time, the width of the flexible wiring board 60 is larger than the separation between the protruded distal end of the holding piece 35b and the sidewall section of the recess formed with the holding groove 35a. However, since the flexible wiring board 60 is flexible, it can be loaded by flexing it along its width and by pushing the opposite longitudinal end to the lower side of the holding piece 35b. Also, since the holding piece 35b of the holder 35 holds the longitudinal opposite end of the flexible wiring board 60, the flexible wiring board can be loaded in position easily. The flexible wiring board 60, loaded on the holder 35, is clamped between the holding groove 35a and the holding piece 35b against accidental removal.

With the present magnetic head device 1, the holder 35 is provided on the base portion 3b of the stationary portion 3, and the flexible wiring board 60 is held by this holder 35, for limiting the width of longitudinal flexure of the flexible wiring board 60. Thus, with this magnetic head device 1, there is only little risk of the flexible wiring board 650 rubbing against or being entwined with the stationary portion 3 or other members in the photomagnetic recording/reproducing apparatus.

In the present magnetic head device, in which the flexible wiring board 60 is loaded on the holder 35 formed on the stationary portion 3 for securing the flexible wiring board 60 on the stationary portion 3, there is no necessity of providing new components, such as adhesive. Also, the flexible wiring board 60 can be secured to the stationary portion 3 by simply securing the flexible wiring board 60 to the stationary portion 3, thus simplifying the operation.

The stationary portion 3 is formed as-one with a pivot amount regulating arm 32 for protruding from the proximal ends towards the distal ends of the paired electrically conductive members 2, 2, as shown in FIGS. 1 and 2. The pivot amount regulating arm 32, formed of the same material as the stationary portion 3, serves for regulating the pivoting amount of the head mounting portion 5 and the head support member 6. The pivot amount regulating arm 32 is formed for extending from the stationary portion 3 along the head support member 3 and the head mounting portion 5. This pivot amount regulating arm 32 has its distal end formed with a first regulating portion 32a for compressing against the head mounting portion 5 to regulate the pivoting amount of the head mounting portion 5 on pivoting of the head mounting portion 5 and the head support member 6. Partway on the pivot amount regulating arm 32 is formed a second regulating portion 32b for compressing against the head support member 6 for regulating the pivoting amount of the head support member 6.

The first regulating portion 32a is formed for being protruded from the distal end of the pivot amount regulating arm 32 towards the head mounting portion 5. If none of the head support member 6 nor the head mounting portion 5 is pivoted, the first regulating portion 32a when projected on a plane is spaced a small distance from the distal end of the head mounting portion 5. When the head support member 6 and the head mounting portion 5 are pivoted in a direction away from the loaded disc cartridge, the first regulating portion 32a compresses against the distal end of the head mounting portion 5 to regulate the pivoting amount of the head mounting portion 5.

The second regulating portion 32b is formed for projecting from a mid portion of the pivot amount regulating arm 32 towards the head support member 6. The second regulating portion 32b is located so that, in the state in which none of the head support member 6 nor the head mounting portion 5 is pivoted, the second regulating portion 32b is positioned directly above the second cut-out 6b formed in the head support member 6 when the second regulating portion 32b is projected on a plane. When the head support member 6 and the head mounting portion 5 are moved in a direction away from the loaded disc cartridge, the second regulating portion 32b is abutted against the vicinity of the second cut-out 6b of the head support member 6 to regulate the pivoting amount of the head support member 6.

In the present magnetic head device 1, mounted in the photomagnetic recording/reproducing apparatus, when the disc cartridge holding a magneto-optical disc is loaded on or unloaded from the photomagnetic recording/reproducing apparatus, the head mounting portion 5 and the head supporting member 6 are moved by a movement member, as later explained, in a direction away from the magneto-optical disc holding position, for delimiting a spacing sufficient for loading/unloading of the disc cartridge holding the magneto-optical disc between the magnetic head device and the optical pickup device. The pivoting amount is regulated by the first regulating portion 32a sand the second regulating portion 32b of the pivot amount regulating arm 32 compressing against the head mounting portion 5 and the head support member 6, respectively.

Thus, with the present magnetic head device 1, any excess pivoting of the head mounting portion 5 and the head support member 6 can be regulated, while the first resilient flexible portions 7, 7 and the second resilient flexible portions 8, 8 can be prevented from being deformed or destructed. In addition, the height position of the head mounting portion 5 can be regulated after pivoting.

Figure 16:
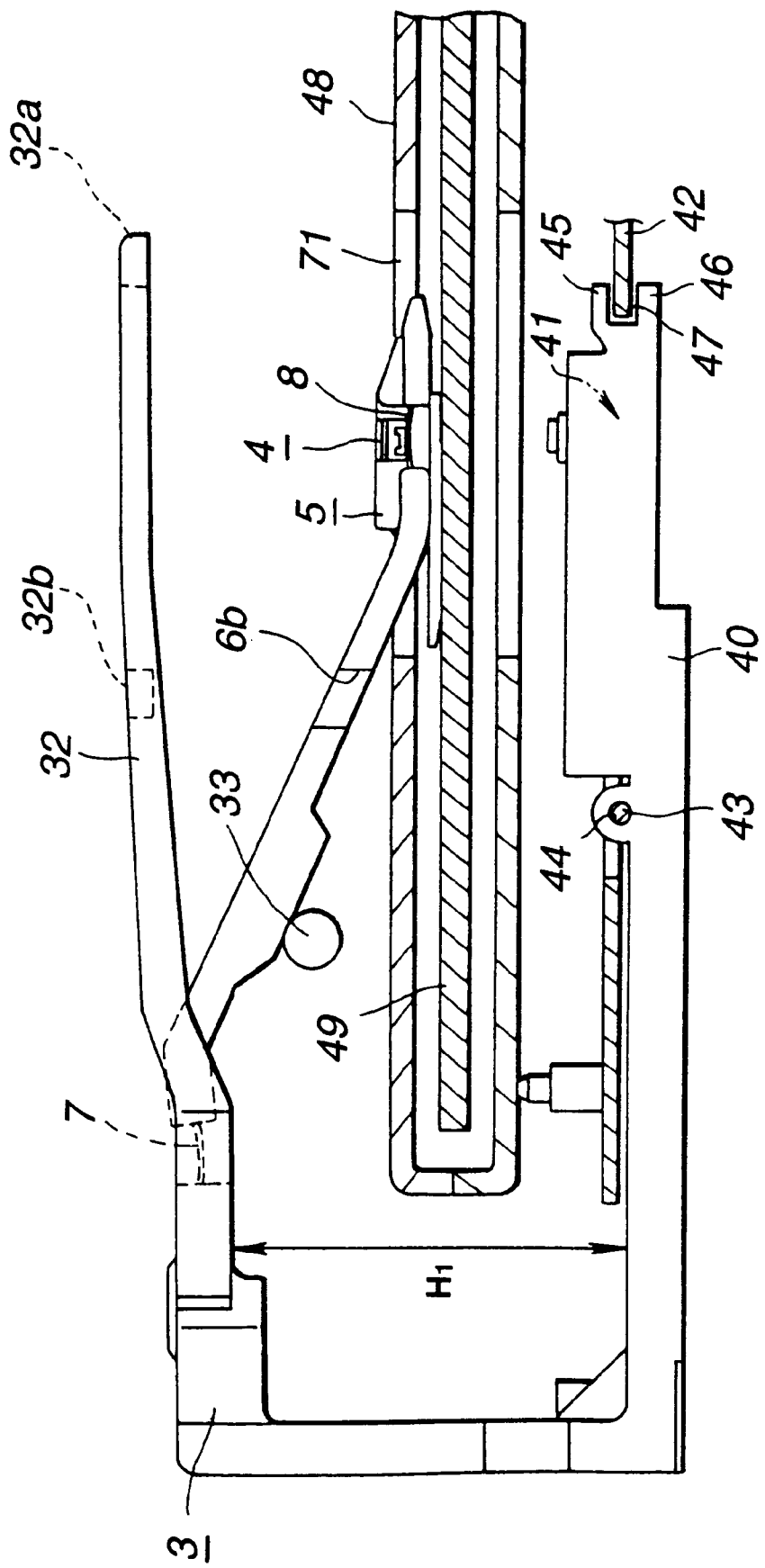
FIG. 16 is a side view showing the state of sliding contact with the magneto-optical disc of the magnetic head of the magnetic head device according to the present invention.
Figure 17:
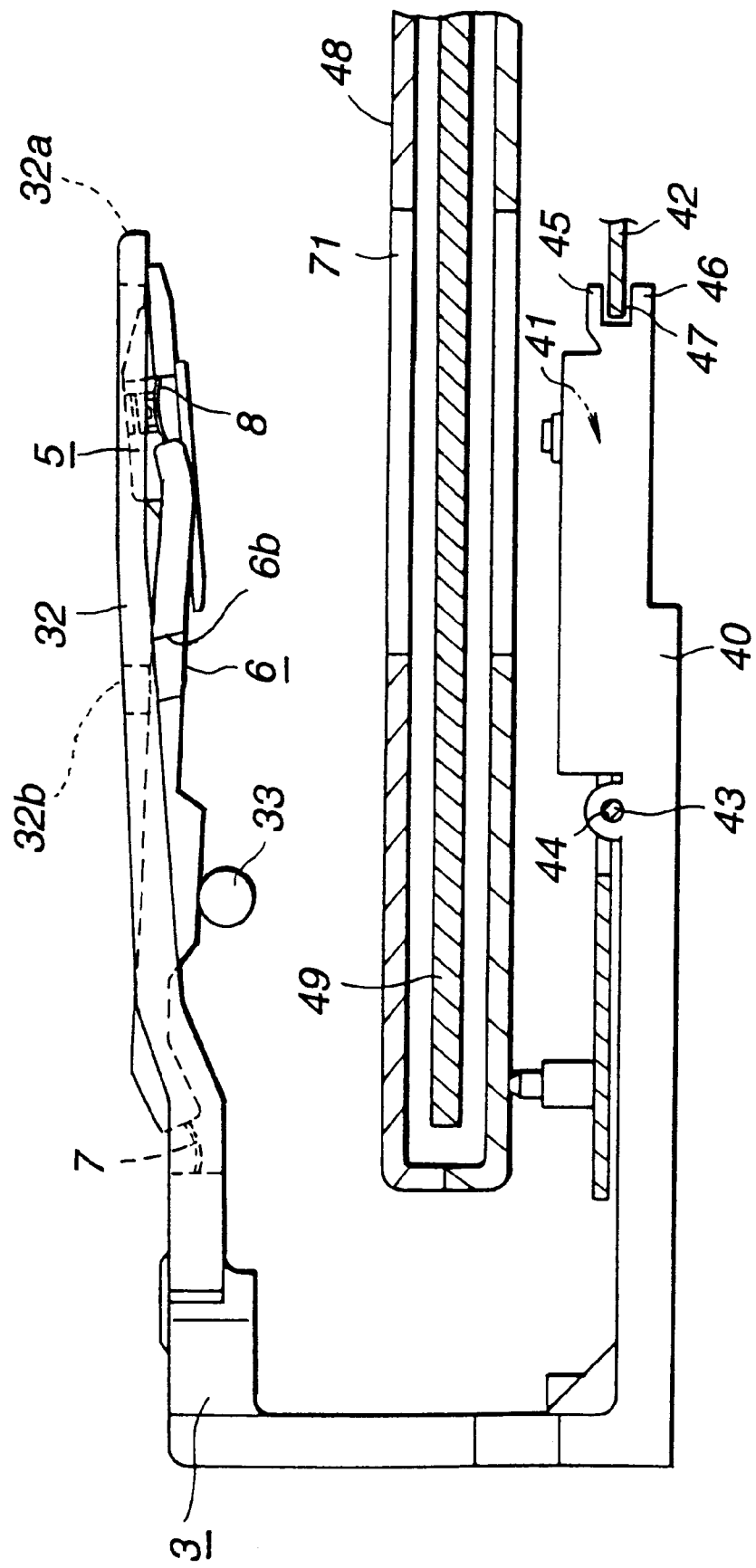
FIG. 17 is a side view of the magnetic head device of the present invention, shown with the magnetic head being detached from the magneto-optical disc.

The above-described magnetic head device 1 is mounted on a movable base block 40 movably mounted in the photomagnetic recording/reproducing apparatus, as shown in FIGS. 16 and 17. The movable base block 40 also carries an optical pickup device 41. Thus, the magnetic head device 1 is moved in the photomagnetic recording/reproducing apparatus in synchronism with the optical pickup device 41.

The movable base block 40, carrying the magnetic head device 1 and the optical pickup device 41, is supported for movement along the radius of a magneto-optical disc 49 held in the disc cartridge 48 loaded on the photomagnetic recording/reproducing apparatus, by having a slide guide shaft 43 mounted on a chassis substrate 42 carrying the mechanical components, such as disc rotating driving unit, passed through a through-hole 44, and by having a slide guide shaft 47 provided on one side of the chassis substrate 42 supported by paired upper and lower engagement pieces 45, 46 provided on the terminal sides. This movable base block 40 is moved along the radius of the magneto-optical disc 49 via a pickup feed unit driven by a driving motor, not shown.

In the optical pickup device 41, an objective lens for converging a light beam from a light source on a signal recording layer of the magneto-optical disc 49 is mounted on the distal end of the movable base block 40 for facing the magneto-optical disc 48. The optical pickup device 41 is mounted on the movable base block 40 so that the optical axis of the objective lens is positioned on the centerline of the magneto-optical disc 49.

On the opposite side of the movable base block 40 with respect to the side carrying the optical pickup device 41 is mounted the magnetic head device 1. The magnetic head device 1 has the stationary portion 3 mounted on the movable base block 40 so that the head support member 6 is extended over the disc cartridge 48 loaded on a cartridge loading unit. The magnetic head device 1 is mounted in position on the movable base block 40, by having a positioning pin set upright on the upper end face of the movable base block 40 engaged in the engagement recess formed in the bottom surface of the stationary portion 3, using a set screw passed through the stationary member inserting opening 34 into meshing with a mating tapped hole in the movable base block 40.

When the magnetic head device 1 is mounted on the movable base block 40, the center magnetic pole core 10a of the magnetic core 10 of the magnetic head device 4, mounted on the head mounting portion 5 supported via second resilient flexible portions 8, 8 on the distal end of the head support member 6, faces the objective lens of the optical pickup device 41, with the magneto-optical disc 49 in-between, for applying an external magnetic field to the light beam irradiation point on the magneto-optical disc 49.

The magnetic head device 1, mounted on the movable base block 40, is fed in the radial direction of the magneto-optical disc 49 in unison with the optical pickup device 41, by the movable base block 40 being driven by the pickup feed unit. Since the flexible wiring board 60 is held on the holder 35 provided in the stationary portion 3 and thereby has the flexure in the longitudinal direction limited in width, there is no risk of the flexible wiring board 60 rubbing against or being entwined with other components in the device 1. The movement direction of the magnetic head device relative to the magneto-optical disc 49 is perpendicular to the longitudinal direction of the head support member 6.

The head support member 6, extended from the stationary portion 3 of a height H1 to maintain the spacing via which to load or unload the disc cartridge 48 via first resilient flexible portions 7, 7 to a position above the disc cartridge 48, is inclined from the first resilient flexible portions 7, 7 towards the distal end carrying the head mounting portion 5, in order for the head mounting portion 5 mounted on the distal end of the head support member 6 to have a sliding contact with the magneto-optical disc 49 loaded on the cartridge loading unit.

If the above-mentioned pivoting actuating member 33 is not operated, the head mounting portion 5 supported on the distal end of the head support member 6 is intruded into the disc cartridge 48, as shown in FIG. 16, in order for the slide contact portion 15 formed on the bobbin 12 to have a sliding contact with the magneto-optical disc 49. If the slide contact portion 15 has a sliding contact with the magneto-optical disc 49, the first resilient flexible portions 7, 7 are resiliently displaced to bias the head support member 6 towards the magneto-optical disc 49. Thus, the slide contact portion 15 is brought into sliding contact with the magneto-optical disc under a pre-set slide contact pressure.

Within the photomagnetic recording/reproducing apparatus, mounting the magnetic head device 1, there is provided a head rotating driving unit, not shown, for actuating the pivoting actuating member 33 for pivoting the head mounting portion 5 and the head support member 6 in a direction away from the disc cartridge 48 about the first resilient flexible portions 7, 7 as center. At this time, the head mounting portion 5 of the magnetic head device 1 compresses against the first regulating portion 32a of the pivot amount regulating arm 32, as shown in FIG. 17, to cause the head support member 6 to be pivoted to a position abutting against the second regulating portion 32b. By this pivoting displacement of the head mounting portion 5 and the head support member 6, the head mounting portion 5 is disengaged from the inside of the disc cartridge 48 to give a spacing large enough to permit loading/unloading of the disc cartridge 48 between the head mounting portion 5 and the optical pickup device 41.

Meanwhile, the magnetic head device 1, mounted on the photomagnetic recording/reproducing apparatus, is moved radially of the magneto-optical disc 49 with the direction perpendicular to the direction of extension of the head support member 6 as the movement direction. If the head mounting portion 5 is moved until the center magnetic pole core 10a of the magnetic core 10 is positioned at an outer rim side of the signal recording area of the magneto-optical disc 49, a lateral side of the slide contact portion 15 is protruded to the outermost rim of the magneto-optical disc 49. For preventing the head mounting portion 5 from being protruded from the magneto-optical disc 49 even on movement of the head mounting portion 5 to the outermost rim portion, the slide contact portion 15 has its side formed as an inclined portion 15b extending along the outer rim f the magneto-optical disc 49. That is, since the side of slide contact portion 15 disposed on the outer rim side of the magneto-optical disc 49 is the inclined portion 15b, there is no risk of the slide contact portion 15 riding on the thickened outer rim portion of the magneto-optical disc 49 even if the head mounting portion 5 is moved as far as the thickened outer rim portion of the magneto-optical disc 49. Thus, the slide contact surface 15a of the slide contact portion 15 has a reliable sliding contact with the signal recording area of the magneto-optical disc 49.

The slide contact portion 15, protruded towards the stationary portion 3 of the supporting member, is desirably protruded to the maximum extent possible to reduce its equivalent mass.

By forming the slide contact portion 15 such as to maximize its protrusion for lowering the equivalent mass, it is possible to reduce the defocusing.

The bobbin 12, formed with the slide contact portion 15, adapted to have a relative sliding contact with the rotating magneto-optical disc 49, is desirably formed of a material superior in sliding performance and abrasion resistance, lightweight and which can be molded to high dimensional accuracy. The materials making up the bobbin 12 may be synthetic resin materials exemplified by polyphenylene sulfide (PPS), polyacetal (POM), polyarylate (PAR), polyimide 6, polyamide 66, polyethylene terephthalate (PET), polybutylene terephthalate (TBT), ultra-high molecular weight polyethylene (UHMW-PE) or high molecular weight polyethylene (HME-PE).

The stationary portion 3, head support member 6, head mounting portion 5 and the pivot amount regulating arm 32 are not contacted with the magneto-optical disc and hence need not be formed of a material having superior sliding performance and abrasion resistance, but may be formed of an inexpensive resin material.

The stationary portion 3, head mounting portion 5, head support member 6 and the pivot amount regulating arm 32, formed of a synthetic resin material, are molded simultaneously by insert molding by injecting the synthetic resin material into a cavity of a metal mold device in which are placed the paired electrically conductive members 2, 2.

When projected on a plane, the components parts of the magnetic head device are arranged so that none of the portions of the head mounting portion 5, head support member 6, stationary portion 3 nor the pivot amount regulating arm 32 overlap with each other, so that the magnetic head device can be molded at a time using upper and lower paired metal molds.

If suitable different materials are selectively used for the stationary portion 3, head mounting portion 5, head support member 6 and the pivot amount regulating arm 32, the dichromatic molding method may be used for molding.

In the present magnetic head device 1, the spring constants of the first resilient flexible portions 7, 7 and the second resilient flexible portions 8, 8 are set so that, when the height position of the magnetic head element 4 is varied, with a pre-set point as an operating point, there is such a point in the slide contact portion 15 in which an angular change of the first resilient flexible portions 7, 7 and the angular change of the second resilient flexible portions 8, 8 are equal in magnitude and opposite in direction (equilibrium point).

Based on an assumed model in which there is such equilibrium point in the slide contact portion 15, the designing of the first resilient flexible portions 7, 7, second resilient flexible portions 8, 8 and pertinent component parts is now explained with reference to FIGS. 18 and 19.

Figure 18:
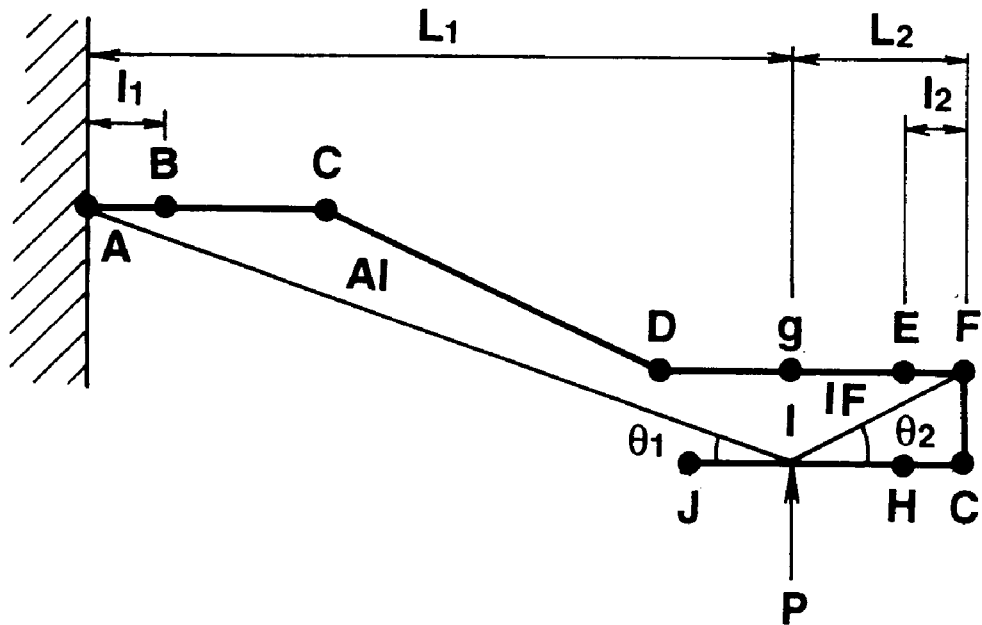
FIG. 18 is a diagrammatic view showing the size of various components making up a magnetic head device.

In FIG. 18, A-B denotes the first resilient flexible portions 7, 7, F-E denotes the second resilient flexible portions 8, 8 and H-J denotes the slide contact portion 15.

Figure 19:
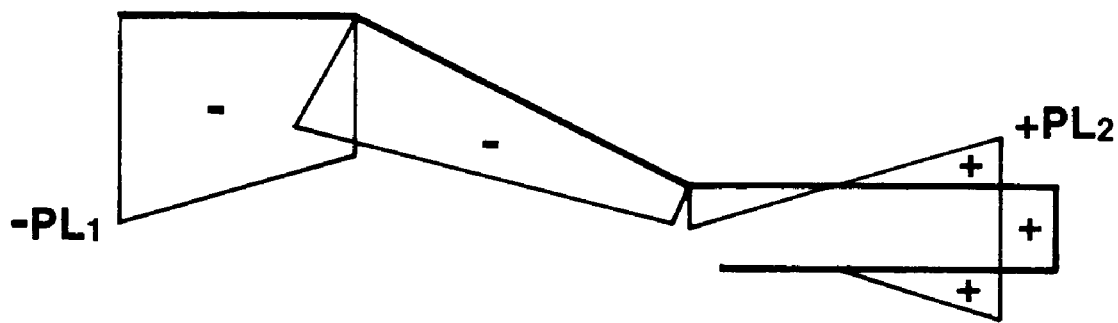
FIG. 19 is a diagrammatic view for illustrating the bending moment on load application to a point I in FIG. 17 in a direction indicated by arrow.

If a load P is applied to a point I in the slide contact portion 15 in a direction indicated by arrow, the bending moment M is as shown in FIG. 19. If $$L_1 = Al \cdot \cos \theta_1 \quad (1)$$

and $$L_2 = lF \cdot \cos \theta_2 \quad (2)$$

the maximum bending moment of $$M_A = -PL_1$$

is produced at a point A of the first resilient flexible portions 7, 7, while a bending moment $$M_F = PL_2$$

is produced at a point F of the second resilient flexible portions 8, 8.

If a differential equation is considered of the first resilient flexible portions 7, 7 and the second resilient flexible portions 8, 8, the following differential equations are obtained for the first resilient flexible portions 7, 7:

$$d^2 y_1/dx_1 = -(-PL_1 X_1/L_1)/EI_1$$

$$dy_1/dx_1 = \int \{-(-PL_1 X_1/L_1)/EI_1\} \cdot dX_1 \quad (4)$$

$$= \int PX_1/EX_1 \cdot dx_1$$

$$= P/EI_1 \cdot (X_1^2/2 + C_1)$$

Since $dy_1/dx_1 = 0$ for the boundary condition $X_1 = L_1$, $$C_1 = L_1^2/2 \quad (5)$$

Therefore, an equation $$dy_1/dx_1 = P/EI_1 \cdot (X_1^2/2 - L_1^2/2) \quad (6)$$

is derived.

Also, $$y_1 = \iint \{-(-PL_1 X_1/L_1)/EI_1\} dx_1 dx_1$$

$$= \int P/EI_1 \cdot (x_1^2/2 - L_1^2/2) dx_1$$

$$= P/EI_1 (X_1^3/6 - L_1^2/2 \cdot X_1 + C_2)$$

From $y_1 = 0$ for the boundary condition of $X_1 = L_1$, $$C_2 = L_1^3/3 \quad (7)$$

Therefore, $$y_1 = P/EI_1 (X_1^3/6 - L_1^2/2 \cdot X_1 + L_1^3/3) \quad (8)$$

is derived.

Similarly, the following differential equations are obtained for the second resilient flexible portions 8, 8:

$$d^2 y_2/dx_2 = -(-PL_2 X_2/L_2)/EI_2 \quad (9)$$

$$dy_2/dx_2 = \int -(PL_2 X_2/L_2)/EI_2\} \cdot dX_2 \quad (10)$$

$$= \int -PX_2/EI_2 \cdot dx_2$$

$$= P/EI_2 \cdot (X_2^2/2 + C_1)$$

Since $dy_2/dx_2 = 0$ for the boundary condition $X_2 = L_2$, $$C_1 = -L_2^2/2 \quad (11)$$

Therefore, an equation $$dy_2/dx_2 = -P/EI_2 \cdot (X_2^2/2 - L_2^2/2) \quad (12)$$

is derived.

Also, $$y_2 = \iint -(PL_2 X_2/L_2)/EI_2 \cdot dx_2 dx_2$$

$$= \int -P/EI_2 \cdot (x_2^2/2 - L_2^2/2) dx_2$$

$$= -P/EI_2 (X_2^3/6 - L_2^2/2 \cdot X_2 + C_2)$$

From $y_2 = 0$ for the boundary condition of $X_2 = L_2$, $$C_2 = L_2^3/3 \quad (13)$$

Therefore, $$y_2 = -P/EI_2 (X_2^3/6 - L_2^2/2 \cdot X_2 + L_2^3/3) \quad (14)$$

is derived.

The condition under which the point I represents an equilibrium point is considered.

The first resilient flexible portions 7, 7 and the second resilient flexible portions 8, 8 are constrained to the paired head support members 6 interconnecting them and hence the sum total of the differential equation at a point B of the first resilient flexible portions 7, 7 integrated once and the differential equation at a point E of the second resilient flexible portions 8, 8 integrated once is zero. Thus, from the above equations 6 and 12, $$P/EI_1(X_1^2/2-L_1^2/2)-P/EI_2(X_2^2/2-L_2^2/2)=0 \qquad (15)$$

Substituting $X_1=(L_1-l_1)$ and $X_2=(L_2-l_2)$, we obtain $$P/EI_1\{(L_1-l_1)^2/2-L_1^2/2\}-P/EI_2\{(L_2-l_2)^2/2-L_2^2/2\}=0 \qquad (16)$$

Therefore, by designing with the size which will satisfy the equation (16), the point I in the slide contact portion 15 can be adopted as the equilibrium point to make possible stable sliding of the magnetic head 9.

In the above equation (16), the longitudinal modulus of elasticity E and the load P can be erased. Therefore, putting the equation (16) in order, we obtain $$l/I_1\{(L_1-l_1)^2-L_1^2\}-l/I_2\{(L^2-l_2)^2-L_2^2\}=0 \qquad (17)$$

The fact that the longitudinal modulus of elasticity E can be erased means that the design value for realizing stable sliding of the magnetic head 9 is not dependent on variations in the longitudinal modulus of elasticity E.

Also, the fact that the load P can be erased means that stable contact of the magnetic head can be assured even for a larger stroke. However, if the stroke exceeds ¹⁄₁₀ of L, the second-order moment of the cross-section is gradually varied. Therefore, this portion needs to be compensated by another method. This other method may, for example, be increasing the length of the slide contact portion 15 (length of H-J of FIG. 18).

Rewriting Image data I1 and I2 in the above equation (17), since $$I_1=b_1t^3/12 \qquad (18)$$

and $$I_2=b_2t^3/12 \qquad (19)$$

we obtain:

$$12/b_1t^3\cdot\{(L_1-l_1)^2-L_1^2\}-12/b_2t^3\cdot\{(L_2-l_2)^2\oplus L_2^2\}=0 \qquad (20)$$

Putting this equation into order, we obtain:

$$l/b_1\cdot\{(L_1-l_1)^2-L_1^2\}-l/b_2\cdot\{(L_2-l_2)^2-L_2^2\}=0 \qquad (21)$$

Since this erases the plate thickness t, the design value for stabilized sliding of the magnetic head 9 is not dependent on the plate thickness t. That is, even if the plate thickness varies slightly from one component to another, designing for stabilized sliding movement of the magnetic head 9 is possible on the condition that the plate thicknesses of the first resilient flexible portions 7, 7 and the second resilient flexible portions 8, 8 are constant.

To sum, if the magnetic head device 1 is designed to satisfy the equation (22):

$$I_1/I_1\cdot\{(L_1-l_1)^2-L_1^2\}l/I_2\cdot\{(L_2-l_2)^2-L_2^2\}=0$$

where $$0<l_1<L_1 \text{ and } 0<l_2<L_2 \qquad (22)$$

the magnetic head 9 can be slid stably.

In designing various components, it is necessary to take dimensional tolerances of the various components into account. It suffices in this case to combine the maximum and minimum values of the dimensional tolerances of the various components and to substitute the worst probable conditions into the equation (22) to find the position of the force operating point I to make dimensional designing of the slide contact portion 15 so that this point I will be present within the slide contact portion 15.

By designing the magnetic head device in this manner, the magnetic head' 9 can be made to have a relative sliding contact in stability with the rotating magneto-optical disc 49. For example, if the major surface of the magneto-optical disc 49 presents micro-irregularities such that the head mounting portion 5 is pivoted and displaced about the second resilient flexible portions 8, 8 due to these micro-irregularities, the magnetic head 9 can be brought into sliding contact with the magneto-optical disc 49 in stability.

Also, since the present magnetic head device 1 is designed so that the equilibrium point will be in the slide contact portion 15, the magnetic head can be slidingly contacted with the magneto-optical disc 49 in stability to follow up with surface deviations of the magneto-optical disc 49, even if relatively large surface deviations are produced on rotation of the magneto-optical disc 49 to make possible stabilized application of the external magnetic field.

The foregoing description has been made of a magnetic head device in which the magnetic head element 4 made up of the magnetic core 10 and the bobbin 12 carrying the coil 11 is supported on the distal end of the head supporting member and the sliding member 15 is slid on the rotating magneto-optical disc 49 to maintain a constant separation between the magnetic head element 4 and the magneto-optical disc 49. This invention is, however, not limited to the configuration and can be applied to any type of the magnetic head device in which the magnetic head is supported on a head supporting member.

What is claimed is:

1. A magnetic head device comprising:
    a pair of electrically conductive members arranged substantially parallel to each other;
    a head support member molded as-one with said electrically conductive members;
    a stationary portion molded as-one with the electrically conductive members at the proximal end of the head support member, said stationary portion serving for mounting the magnetic head device within a photo-magnetic recording/reproducing apparatus;
    a head mounting portion molded as-one with the electrically conductive members at the distal end of the head support member, said head mounting portion serving for carrying a magnetic head element; and
    a slide contact member mounted on a surface of said magnetic head element facing a recording medium;
    said electrically conductive members constituting first resilient flexible portions between the head supporting member and the stationary portion, said electrically conductive members also constituting second resilient flexible portions between the head supporting member and the head mounting portion;
    said first resilient flexible portions and the second resilient flexible portions having spring constants set so that an equilibrium point for which an angular change of said first resilient flexible portions and an angular change of said second resilient flexible portions will be equal in magnitude and opposite in direction within the extent of said slide contact member;
    said electrically conductive members configured and connected for carrying signals to and from said magnetic head element.

2. The magnetic head device as claimed in claim 1 wherein said slide contact member is mounted on said recording medium facing surface of the magnetic head element for being protruded from the head mounting portion towards said head support member.

3. A magnetic head device comprising:

a magnetic head element having a bobbin carrying a coil and a magnetic core at least partially inserted into a magnetic core inserting opening formed in said bobbin;

a supporting member supporting said magnetic head element; and a flexible wiring board for connecting the coil of the magnetic head element to an external circuit;

said supporting member having a holder for holding said flexible wiring board;

said flexible wiring board extending between said supporting member and a fixed mounting member so as to support said supporting member on said mounting member and to carry signals therebetween, said supporting member having a head supporting member molded as-one with a pair of electrically conductive members arranged substantially parallel to each other;

a stationary portion molded as-one with the electrically conductive members at the proximal end of the head supporting member, said stationary portion serving for mounting the magnetic head device within a photomagnetic recording/reproducing apparatus; and a head mounting portion molded as-one with the electrically conductive members at the distal end of the head supporting member, said head mounting portion serving for carrying a magnetic head element;

the holder for holding said flexible wiring board being formed in said stationary portion.

4. A magnetic head device comprising:

a pair of electrically conductive members arranged substantially parallel to each other;

a head support member molded as-one with said electrically conductive members;

a stationary portion molded as-one with the electrically conductive members at the proximal end of the head support member, said stationary portion serving for mounting the magnetic head device within a photomagnetic recording/reproducing apparatus;

a head mounting portion molded as-one with the electrically conductive members at the distal end of the head support member, said head mounting portion serving for carrying a magnetic head element;

first resilient flexible portions including electrically conductive members between said head support member and the head mounting portion for pivotally supporting he head mounting portion relative to the head support member;

second resilient flexible portions including electrically conductive members between said head support member and the head mounting portion for pivotally supporting the head mounting portion relative to the head support member; and a pivoting amount regulating member for regulating the pivoting amount of said head support member and the head mounting portion;

said pivoting amount regulating member including a first regulating piece abutted against said head mounting portion for regulating the pivoting amount of the head mounting portion and a second regulating piece abutted against said head support member for regulating the pivoting amount of the head support member;

said electrically conductive members configured and connected for carrying signals to and from said magnetic head element.

5. The magnetic head device as claimed in claim 4 wherein said pivoting amount regulating member is molded as-one with the stationary portion so that the pivoting amount regulating member when projected on a plane is not overlapped with the head support member.

* * * * *